(12) United States Patent
Habas et al.

(10) Patent No.: US 10,350,583 B2
(45) Date of Patent: Jul. 16, 2019

(54) METAL PHOSPHIDE CATALYSTS AND METHODS FOR MAKING THE SAME AND USES THEREOF

(71) Applicant: Alliance for Sustainable Energy, LLC, Golden, CO (US)

(72) Inventors: Susan Ellen Habas, Arvada, CO (US); Jun Wang, Highlands Ranch, CO (US); Daniel A. Ruddy, Arvada, CO (US); Frederick Raymond Gabriel Baddour, Denver, CO (US); Joshua Schaidle, Arvada, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 56 days.

(21) Appl. No.: 15/458,397

(22) Filed: Mar. 14, 2017

(65) Prior Publication Data
US 2017/0197200 A1 Jul. 13, 2017

Related U.S. Application Data

(62) Division of application No. 15/174,691, filed on Jun. 6, 2016, now Pat. No. 9,636,664.

(60) Provisional application No. 62/170,906, filed on Jun. 4, 2015.

(51) Int. Cl.
| | | |
|---|---|---|
| *B01J 27/19* | (2006.01) | |
| *C01B 25/08* | (2006.01) | |
| *B01J 27/185* | (2006.01) | |
| *B01J 35/00* | (2006.01) | |
| *B01J 37/08* | (2006.01) | |
| *C10G 3/00* | (2006.01) | |
| *B01J 35/02* | (2006.01) | |
| *B01J 37/00* | (2006.01) | |

(52) U.S. Cl.
CPC .......... *B01J 27/19* (2013.01); *B01J 27/1853* (2013.01); *B01J 27/1856* (2013.01); *B01J 35/002* (2013.01); *B01J 35/0013* (2013.01); *B01J 35/023* (2013.01); *B01J 37/0018* (2013.01); *B01J 37/086* (2013.01); *C01B 25/08* (2013.01); *C01B 25/088* (2013.01); *C10G 3/45* (2013.01); *C10G 3/46* (2013.01); *C10G 3/47* (2013.01); *B01J 37/08* (2013.01); *Y02P 30/20* (2015.11)

(58) Field of Classification Search
None
See application file for complete search history.

(56) References Cited

U.S. PATENT DOCUMENTS

| | | |
|---|---|---|
| 4,185,081 A | 1/1980 | Fauth et al. |
| 5,688,909 A | 11/1997 | Drent et al. |
| 7,446,075 B1 | 11/2008 | Kolev |
| 8,465,716 B2 | 6/2013 | Le Floch et al. |
| 8,753,592 B2 | 6/2014 | Strupeit et al. |
| 9,636,664 B1 | 5/2017 | Habas et al. |
| 2014/0150332 A1 | 6/2014 | Lee et al. |
| 2014/0158937 A1* | 6/2014 | Jang ..................... C09K 11/025 252/301.36 |

FOREIGN PATENT DOCUMENTS

| | | |
|---|---|---|
| WO | WO 2001/023501 A1 | 4/2001 |
| WO | WO 2010/071459 A1 | 6/2010 |

OTHER PUBLICATIONS

Balli et al., "Magnetocaloric Effect in Ternary Metal Phosphides $(Fe_{1-x}Ni_x)_2P$", Journal of Magnetism and Magnetic Materials, 2007, vol. 316, pp. 358-360.
Callejas et al., "Electrocatalytic and Photocatalytic Hydrogen Production from Acidic and Neutral-pH Aqueous Solutions Using Iron Phosphide Nanoparticles", ACS Nano, 2014, vol. 8, No. 11, pp. 11101-11107.
Carenco et al., "Controlled Design of Size-Tunable Monodisperse Nickel Nanoparticles", Chemistry of Materials, 2010, vol. 22, pp. 1340-1349.
Carenco et al., "Magnetic Core—Shell Nanoparticles from Nanoscaled-Induced Phase Segregation", Chemistry of Materials, 2011, vol. 23, pp. 2270-2277.
Carenco et al., "Nanoscaled Metal Borides and Phosphides: Recent Developments and Perspectives", Chemical Reviews, 2013, vol. 113, pp. 7981-8065.
Gaudette et al., "Mössbauer Spectroscopy Investigation and Hydrodesulfurization Properties of Iron-Nickel Phosphide Catalysts", Journal of Catalysis, 2010, vol. 272, pp. 18-27.
Ha et al., "The Structural Evolution and Diffusion During the Chemical Transformation 2015 from Cobalt to Cobalt Phosphide Nanoparticles", Journal of Materials Chemistry, 2011, vol. 21, pp. 11498-11510.
Habas et al., "A Facile Molecular Precursor Route to Metal Phosphide Nanoparticles and Their Evaluation as Hydrodeoxygenation Catalysts", Chemistry Materials, 2015, vol. 27, pp. 7580-7592.
Henkes et al., "Converting Metals into Phosphides: A General Strategy for the Synthesis of Metal Phosphide Nanocrystals", Journal of the American Chemical Society, 2007, vol. 129, No. 7, pp. 1896-1897.
Henkes et al., "Trioctylphosphine: A General Phosphorus Source for the Low-Temperature Conversion of Metals into Metal Phosphides", Chemistry of Materials, 2007, vol. 19, No. 17, pp. 4234-4242.

(Continued)

*Primary Examiner* — Yun Qian
(74) *Attorney, Agent, or Firm* — Michael A. McIntyre

(57) ABSTRACT

The present disclosure relates to a method that includes heating a mixture that includes a metal phenylphosphine-containing precursor that includes at least one of $Mo(PPh_3)_2(CO)_4$, $Pd(PPh_3)_4$, $Ru(PPh_3)_3Cl_2$, $Ru(PPh_3)_2(CO)_2Cl_2$, $Co(PPh_3)(CO)_2(NO)$, and/or $Rh(PPh_3)_2(CO)Cl$, a surfactant, and a solvent. The heating is to a target temperature to form a heated mixture containing a metal phosphide nanoparticle that includes at least one of MoP, $Ru_2P$, $Co_2P$, $Rh_2P$, and/or $Pd_3P$, and the metal phosphide nanoparticle is not hollow.

8 Claims, 21 Drawing Sheets

(56) References Cited

OTHER PUBLICATIONS

Henkes et al., "Template-Assisted Synthesis of Shape-Controlled $Rh_2P$ Nanocrystals", Inorganic Chemistry, 2008, vol. 47, pp. 671-677.

Hitihami-Mudiyanselage et al., "Synthesis and Characterization of Discrete $Fe_xNi_{2-x}P$ Nanocrystals ($0 < x < 2$): Compositional Effects on Magnetic Properties", Chemistry of Materials, 2015, vol. 27, pp. 6592-6600.

Jiang et al., "One-pot Synthesis of Carbon-coated $Ni_5P_4$ Nanoparticles and CoP Nanorods for High-rate and High-stability Lithium-ion Batteries", Journal of Materials Chemistry A, 2015, vol. 3, pp. 23345-23351.

Jürgens et al., "Colloidally Prepared Nanoparticles for the Synthesis of Structurally Well-Defined and Highly Active Heterogeneous Catalysts", Angewandte Chemie International Edition, 2008, vol. 47, pp. 8946-8949.

Kelly, "Synthesis, Characterization, and Functionalization of Transition Metal Phosphide Nanomaterials from Single Source Molecular Precursors", A Thesis Submitted in Partial Fulfillment of the Requirements for the Degree of Doctor of Philosophy, Rice University, Nov. 2009, pp. 1-203.

Liyanage et al., "Simultaneous Control of Composition, Size, and Morphology in Discrete $Ni_{2-x}Co_xP$ Nanoparticles", Chemistry of Materials, 2015, vol. 27, pp. 4349-4357.

Muthuswamy et al., "Oxidation Does Not (Always) Kill Reactivity of Transition Metals: Solution-Phase Conversion of Nanoscale Transition Metal Oxides to Phosphides and Sulfides", Journal of the American Chemical Society, 2010, vol. 132, No. 45, pp. 15849-15851.

Muthuswamy et al., "Synthetic Levers Enabling Independent Control of Phase, Size, and Morphology in Nickel Phosphide Nanoparticles", ACS Nano, 2011, vol. 5, No. 3, pp. 2402-2411.

Oyama et al., "Transition Metal Phosphide Hydroprocessing Catalysts: A Review", Catalysis Today, 2009, vol. 143, pp. 94-10.

Pan et al., "An Efficient Method for the Synthesis of Nickel Phosphide Nanocrystals via Thermal Decomposition of Single-source Precursors", RSC Advances, 2015, vol. 5, pp. 11952-11959.

Park et al., "Generalized Synthesis of Metal Phosphide Nanorods via Thermal Decomposition of Continuously Delivered Metal-Phosphine Complexes Using a Syringe Pump", Journal of the American Chemical Society, 2005, vol. 127, No. 23, pp. 8433-844.

Popczun et al., "Highly Active Electrocatalysis of the Hydrogen Evolution Reaction by Cobalt Phosphide Nanoparticles", Angewandte Chemie International Edition, 2014, vol. 53, pp. 5427-5430.

Sénateur, J., et al., "La Selectivite Des Substitutions Dans Les Phases MM'P Etude De L'Ordre Par Diffraction Neutroniques Dans NiCoP", Mater. Res. Bull., 1973, vol. 8, pp. 229-360 (English Abstract).

Shi et al., "Recent Advances in Transition Metal Phosphide Nanomaterials: Synthesis and Applications in Hydrogen Evolution Reaction", Chemical Society Reviews, 2016, vol. 45, pp. 1529-1541.

Wang et al., "Nickel Phosphide Nanoparticles with Hollow, Solid, and Amorphous Structures", Chemistry of Materials, 2009, vol. 21, No. 19, pp. 4462-4467.

* cited by examiner

METAL PHOSPHIDE CATALYSTS AND METHODS FOR MAKING THE SAME AND USES THEREOF

CROSS-REFERENCE TO RELATED APPLICATIONS

This application claims the benefit of U.S. Provisional Application No. 61/170,906 filed Jun. 4, 2015, the contents of which are incorporated herein by reference in its entirety.

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

Bio-oils produced by fast pyrolysis of biomass offer a potentially inexpensive and renewable source for liquid fuels. However, raw bio-oils are complex chemical mixtures with a high oxygen content, typically near 40 wt %, which can lead to a number of undesirable characteristics including low heating values compared to conventional fuels, incompatibility with conventional fuels, chemical instability, and high acidity due to carboxylic acid functionalities. Carboxylic acids include up to 25 wt % of bio-oils, with acetic and formic acids making up the majority of this fraction. The acidity of these compounds contributes to the degradation and instability of bio-oils. Therefore, reducing the acid content is important both for improving fuel properties and fuel stability. Consequently, catalytic upgrading of bio-oils is a critical requirement to reduce the oxygen content of bio-oils and generate a liquid product with "drop-in" ready fuel properties.

Upgrading of bio-oil vapors directly after pyrolysis offers a number of potential advantages, such as yielding a stabilized product upon condensation. However, effective deoxygenation of bio-oils requires catalysts that can readily activate $H_2$, are active in low hydrogen-to-carbon environments, and are stable under acidic conditions.

Solid metal phosphide catalysts have the potential to meet these criteria. However, the methods typically employed to produce solid metal phosphide catalysts require high reaction temperatures and/or air-sensitive reagents that can be cost prohibitive. In addition, current methods sometime produce particles with less than satisfactory physical properties. In some cases, current methods for synthesizing solid metal phosphide catalysts result in inhibitory oxide layers coating the outer surface of the catalyst. Many current methods may also yield polydisperse phases with varying shapes, sizes, and compositions. Such variability can result in downstream manufacturing issues such as bed-life, catalyst activity, reactant conversion rates, and product yield. Finally, current synthesis methods often result in hollow metal phosphide particles. Hollow particles are believed to increase the variability of active sites and provide shorter catalyst life due to the mechanical attrition of the solid catalyst, especially in fluid-bed reactors. These all result in higher bio-oil upgrading costs.

Thus, there is a need for improved methods for producing solid metal phosphide catalysts that result in better quality and better performing metal phosphide materials that will ultimately perform better at the catalytic upgrading of bio-oils.

SUMMARY

An aspect of the present disclosure is a method that includes heating a mixture that includes a metal phenylphosphine-containing precursor that includes at least one of $Mo(PPh_3)_2(CO)_4$, $Pd(PPh_3)_4$, $Ru(PPh_3)_3Cl_2$, $Ru(PPh_3)_2(CO)_2Cl_2$, $Co(PPh_3)(CO)_2(NO)$, and/or $Rh(PPh_3)_2(CO)Cl$, a surfactant, and a solvent. The heating is to a target temperature to form a heated mixture containing a metal phosphide nanoparticle that includes at least one of MoP, $Ru_2P$, $Co_2P$, $Rh_2P$, and/or $Pd_3P$, and the metal phosphide nanoparticle is not hollow. In some embodiments of the present disclosure, the target temperature may be between about 225° C. and about 320° C. In some embodiments of the present disclosure, the target temperature may be maintained for a first time period between about 15 minutes and about 4 hours. In some embodiments of the present disclosure, the surfactant may be oleylamine. In some embodiments of the present disclosure, the solvent may be 1-octadecene.

An aspect of the present disclosure is a method that includes heating a first mixture that includes $Ni(PPh_3)_2(CO)_2$, a phosphine, a surfactant and a solvent, where the heating is to a first target temperature to form a heated mixture containing a nickel phosphide nanoparticle that is not hollow. In some embodiments of the present disclosure, the first target temperature may be between about 225° C. and about 320° C. In some embodiments of the present disclosure, the first target temperature may be maintained for a first time period between about 15 minutes and about 4 hours. In some embodiments of the present disclosure, the surfactant may be oleylamine. In some embodiments of the present disclosure, the solvent may be 1-octadecene.

In some embodiments of the present disclosure, the method may also include, after the first time period has elapsed, adding to the heated or cooled mixture a second metal phenylphosphine-containing precursor that includes at least one of $Rh(PPh_3)_2(CO)Cl$, $Mo(PPh_3)_2(CO)_4$, $Pd(PPh_3)_4$, $Ru(PPh_3)_3Cl_2$, $Ru(PPh_3)_2(CO)_2Cl_2$, and/or $Co(PPh_3)(CO)_2(NO)$ resulting in a second mixture, and heating the second mixture to a second target temperature of about 300° C. to form a second heated mixture containing a bimetallic phosphide nanoparticle that includes at least one of $Ni_xRh_yP_z$, $Ni_xMo_yP_z$, $Ni_xRu_yP_z$, $Ni_xCo_yP_z$, and/or $Ni_xPd_yP_z$, where x, y, and z, are greater than zero, and where the bimetallic phosphide nanoparticle is not hollow. In some embodiments of the present disclosure, a bimetallic phosphide nanoparticle resulting from the methods described above may include at least one of $(Ni_xRh_y)_2P$, $(Ni_xMo_y)_2P$, $(Ni_xRu_y)_2P$, $(Ni_xCo_y)_2P$, and/or $(Ni_xPd_y)_2P$ where x+y=1, and where the bimetallic phosphide nanoparticle is not hollow. In some embodiments of the present disclosure, a crystalline bimetallic phosphide nanoparticle resulting from the methods described above may include at least one of $(Ni_{0.8}Rh_{0.2})_2P$, $(Ni_{0.8}Mo_{0.2})_2P$, $(Ni_{0.8}Ru_{0.2})_2P$, $(Ni_{0.8}Co_{0.2})_2P$, and/or $(Ni_{0.8}Pd_{0.2})_2P$, where the bimetallic phosphide nanoparticle is not hollow. In some embodiments of the present disclosure, the second target temperature may be between about 250° C. and about 350° C. In some embodiments of the present disclosure, the second target temperature may be maintained for a second time period that is between about 5 minutes and about 4 hours.

An aspect of the present disclosure is a composition that includes a phosphide, and a metal that includes at least one of nickel, rhodium, palladium, molybdenum, and/or cobalt, where the composition is a non-hollow nanoparticle, and the composition is substantially crystalline. In some embodiments of the present disclosure, the nanoparticle may have a hexagonal crystal structure or cubic crystal structure, and the hexagonal crystal structure or cubic crystal structure may be substantially pure. In some embodiments of the present disclosure, the composition may have an XRD spectrum that exhibits suppression or elimination of a peak for 2θ between about 42° and about 46°. In some embodiments of the present disclosure, the nanoparticle may have an average particle size between about 2 nm and about 50 nm.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

Figure 1:
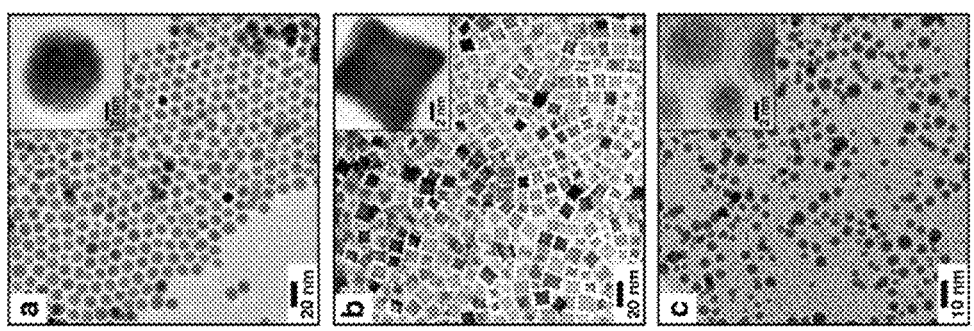
FIG. 1 illustrates transmission electron microscope (TEM) images of crystalline metal phosphide nanoparticles (NPs) produced according to embodiments of the present disclosure; (Panel a) $Ni_2P$, (Panel b) $Rh_2P$, and (Panel c) $Pd_3P$ with high-resolution images inset.

The methods described herein for making metal phosphide catalysts may result in the synthesis of a solid transition metal phosphide catalyst, which may include a base metal or a noble metal. In some cases the metal component of a solid metal phosphide catalyst may include at least one of iron, nickel, copper, molybdenum, rhodium, ruthenium, cobalt, and/or palladium. In some cases, a solid metal phosphide catalyst may be deposited onto a solid support material. A solid support material may include at least one of silica, silica gel, titania, alumina, carbon, and/or any other suitable solid material.

Some of the solid metal phosphide catalysts produced by some of the methods described herein may be characterized as nanoparticles. Some of the solid nanoparticle metal phosphide catalysts may describe a particle shape such as a sphere, cube, cylinder, rod, and/or any other three-dimensional shape. Catalyst particles may be described by a characteristic diameter ranging from about 1 nm to about 1000 nm. In some cases, metal phosphide catalyst particles may have a characteristic diameter ranging from about 1 nm to about 100 nm. Alternatively, the metal phosphide catalyst particles may have a characteristic diameter ranging from about 1 nm to about 50 nm.

As disclosed herein, a solid metal phosphide catalyst may be synthesized utilizing a single metal phenylphosphine-containing precursor, such as $Ni(PPh_3)_2(CO)_2$, $Rh(PPh_3)_2(CO)Cl$, $Pd(PPh_3)_4$, $Fe(PPh_3)_2(CO)_3$, $Ru(PPh_3)_3Cl_2$, $Ru(PPh_3)_2(CO)_2Cl_2$, $Co(PPh_3)(CO)_2(NO)$, $Cu(PPh_3)_2NO_3$, and/or $Mo(PPh_3)_2(CO)_4$. In some cases, a method for synthesizing a solid metal phosphide catalyst may utilize an additional source of phosphine, e.g. a phosphine, such as triphenylphosphine, diphenylphosphine, bis(diphenylphosphino)acetylene, trimethylphosphine, trioctylphosphine, tri-n-butylphosphine, tri-tert-butylphosphine, tris(dimethylamino)phosphine, tris(diethylamino)phosphine, diphenyl(trimethylsilyl)phosphine, diphenylmethylphosphine, and/or tris(trimethylsilyl)phosphine.

A method for synthesizing a solid metal phosphide catalyst may use a surfactant such as oleylamine, octylamine, didodecylamine, oleic acid, octadecanol, hexadecanoic acid, perfluorotetradecanoic acid, hexadecanethiol, polypropylene glycol, and/or polyvinylpyrolidone. The method for making a solid metal phosphide catalyst may use a solvent that may be characterized as a non-coordinating or weakly coordinating solvent. Examples of non-coordinating solvents include 1-octadecene, octadecane, squalane, trioctylphosphine oxide, dibenzyl ether, and/or propylene carbonate.

A method for making solid metal phosphide catalyst may include heating the mixture to a target temperature to form a heated mixture containing the metal phosphide compound, where the target temperature may be between about 150° C. and about 400° C. In some cases, the target temperature for synthesizing a solid metal phosphide catalyst, by heating a mixture that includes a metal phenylphosphine-containing precursor, a surfactant, a solvent, and/or a phosphine may be between about 225° C. and about 320° C. In some further cases, the reaction including a metal phenylphosphine-containing precursor, a surfactant, a solvent, and/or a phosphine may be heated to the target temperature from ambient conditions rapidly such as within a matter of minutes; e.g. from about 1 minute to about 30 minutes.

Once a mixture including a single metal phenylphosphine-containing precursor, a surfactant, a solvent, and/or a phosphine has reached the target temperature as described above, the mixture may be maintained at this temperature for a period of time. This period of time may be between about 10 minutes and about 8 hours. In other cases, the reaction period may be between about 15 minutes and about 4 hours. In further examples, the mixture that was heated and maintained at the target temperature may be cooled after the reaction period has elapsed. A mixture containing at least a single metal phenylphosphine-containing precursor, a surfactant, and a solvent, either during the heating and/or during the reaction, may be agitated. Agitation may be provided utilizing mechanical agitation or by bubbling a gas-phase through a liquid/solid phase mixture (e.g. the mixture of at least a single metal phenylphosphine-containing precursor, a surfactant, a solvent, and/or a phosphine) or liquid solution.

In some embodiments of the present invention, after contacting a mixture that includes at least a single metal phenylphosphine-containing precursor, a surfactant, and a solvent, and after heating and cooling the mixture, an organic compound may be added to the cooled mixture to form an intermediate mixture. Examples of organic compounds include chloroform ($CHCl_3$) and/or any other suitable compounds (e.g. dichloromethane, 1,2-dichloroethane, tetrachloroethylene, hexane, cyclohexane, toluene, octane, diethylether, and/or tetrahydrofuran).

After contacting a mixture that includes at least a single metal phenylphosphine-containing precursor, a surfactant, and a solvent, and after heating and cooling the mixture, a second solvent may be added to the cooled mixture, such that adding the second solvent results in the formation of a solid metal phosphide catalyst. For example, the formation may occur due to the precipitation of the solid metal phosphide catalyst from solution. Examples of a suitable second solvent for precipitating and/or flocculating a solid metal phosphide catalyst in solution include 2-propanol, acetone, benzyl alcohol, 1-4-butanediol, butanol, 2-butanol, n-butanol, butanol, ethanol, ethylene glycol, 2-ethylhexanol, glycerol, methanol, and/or any other suitable hydroxyl group functionalized solvent that is miscible in the solvent.

Utilizing some of the methods described above will yield final solid metal phosphide catalyst particles that are substantially solid and lack any significant void volume. In other words, the methods described herein may result in solid particles that are not hollow.

In addition to providing control over the size, shape, and crystal structure of nanoparticles, the solution synthesis methods described herein may enable the post-synthetic dispersion of the nanoparticles on various support materials for catalytic testing with minimal influence of the support material on the final catalyst attributes. This may allow for direct comparison between different supports, and in the case of metal phosphides, allow for preparation of alumina-supported catalysts that are difficult to prepare by bulk methods due to interaction of the phosphorus-containing precursors with the alumina.

As disclosed herein, bimetallic metal phosphide nanoparticles may be manufactured according to the following reaction:

(Reaction 1)

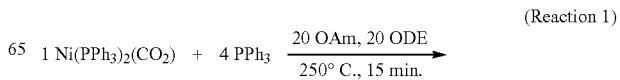

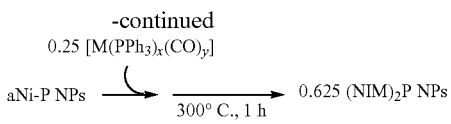

$$0.25\,[M(PPh_3)_x(CO)_y]$$
$$aNi\text{-}P\ NPs \xrightarrow{300°\,C.,\,1\,h} 0.625\,(NIM)_2P\ NPs$$

where M is a metal such as rhodium, molybdenum, ruthenium, cobalt, copper, and/or palladium.

Thus, as shown in Reaction 1 above, a metal phosphide nanoparticle may be produced in a first reaction step that reacts a first metal phenylphosphine-containing precursor that includes at least one of $Ni(PPh_3)_2(CO)_2$, $Mo(PPh_3)_2(CO)_4$, $Pd(PPh_3)_4$, $Ru(PPh_3)_3Cl_2$, $Ru(PPh_3)_2(CO)_2Cl_2$, $Co(PPh_3)(CO)_2(NO)$, and/or $Rh(PPh_3)_2(CO)Cl$ in a mixture containing a surfactant, a solvent, and triphenylphosphine ($PPh_3$). For example, the first metal phenylphosphine-containing precursor may be $Ni(PPh_3)_2(CO)_2$ and the metal phosphide nanoparticle may be nickel phosphide, $Ni_xP_{x-1}$, where x=1 to 2. Similarly, some embodiments of the present disclosure may produce substantially pure metal nanoparticles including nickel, molybdenum, ruthenium, rhodium, palladium, and/or copper. The metal phosphide nanoparticle made in the first reaction step may be substantially amorphous. Alternatively, the metal phosphide nanoparticle made in the first reaction step may be substantially crystalline. The metal phosphide nanoparticle may be solid (e.g. not hollow). Alternatively, the metal phosphide nanoparticle may be hollow, where "hollow" refers to a particle having an empty internal space and/or void volume that is formed by the outer walls and/or surfaces of the particle. The solvent may include 1-octadecene. The surfactant may include oleylamine. The first reaction step may proceed at a temperature between about 150° C. and about 300° C. The first reaction step may proceed at a temperature between about 225° C. and about 275° C. The first reaction may proceed at a temperature between about 275° C. and about 300° C. to produce a metallic metal phosphide nanoparticle that is substantially crystalline to 100% crystalline. The first reaction may proceed at a temperature below about 300° C. to produce a metallic metal phosphide nanoparticle that is substantially amorphous to 100% amorphous. The first reaction may proceed for a period of time between about 5 minutes and about 60 minutes. The first reaction may proceed for a period of time between about 10 minutes and about 20 minutes. The first reaction may begin with about 10 to about 100 molar equivalents of solvent (e.g. 1-ocadecene) per mole of nickel provided by the first metal phenylphosphine-containing precursor (e.g. $Ni(PPh_3)_2(CO)_2$). The first reaction may begin with about 10 to about 30 molar equivalents of solvent per mole of nickel provided by the first metal phenylphosphine-containing precursor. The first reaction may begin with about 1 to about 100 molar equivalents of surfactant (e.g. oleylamine) per mole of nickel provided by the first metal phenylphosphine-containing precursor (e.g. $Ni(PPh_3)_2(CO)_2$). The first reaction may begin with about 10 to about 30 molar equivalents of surfactant per mole of nickel provided by the first metal phenylphosphine-containing precursor.

Following the first reaction step to produce a metal phosphide nanoparticle, $Ni_xP_{x-1}$, where x=1 to 2, a second metal phenylphosphine-containing precursor may be added to the reaction mixture to produce a bimetallic phosphide nanoparticle, as shown by the second reaction step of Reaction 1. The second metal phenylphosphine-containing precursor may include $Rh(PPh_3)_2(CO)Cl$, $Mo(PPh_3)_3(CO)_4$, $Pd(PPh_3)_4$, $Ru(PPh_3)_3Cl_2$, $Ru(PPh_3)_2(CO)_2Cl_2$, $Cu(PPh_3)_2NO_3$, and/or $Co(PPh_3)(CO)_2(NO)$, such that the a bimetallic phosphide nanoparticle includes at least one of $Ni_xRh_yP_z$, $Ni_xMo_yP_z$, $Ni_xRu_yP_z$, $Ni_xCo_yP_z$, and/or $Ni_xPd_yP_z$, where x, y, and z, are greater than zero, and where the bimetallic phosphide nanoparticle is not hollow. In some embodiments of the present disclosure, a bimetallic phosphide nanoparticle resulting from the methods described above may include at least one of $(Ni_xRh_y)_2P$, $(Ni_xMo_y)_2P$, $(Ni_xRu_y)_2P$, $(Ni_xCo_y)_2P$, and/or $(Ni_xPd_y)_2P$ where x+y=1, and where the bimetallic phosphide nanoparticle is not hollow. In some embodiments of the present disclosure, a crystalline bimetallic phosphide nanoparticle resulting from the methods described above may include at least one of $(Ni_{0.8}Rh_{0.2})_2P$, $(Ni_{0.8}Mo_{0.2})_2P$, $(Ni_{0.8}Ru_{0.2})_2P$, $(Ni_{0.8}Co_{0.2})_2P$, and/or $(Ni_{0.8}Pd_{0.2})_2P$, where the bimetallic phosphide nanoparticle is not hollow In some embodiments of the present disclosure, the bimetallic phosphide nanoparticle may be solid (e.g. not hollow). Alternatively, the bimetallic phosphide nanoparticle may be hollow. The second reaction step may proceed at a temperature between about 150° C. and about 400° C. The second reaction step may proceed at a temperature between about 250° C. and about 350° C. The bimetallic phosphide nanoparticle made in the second reaction step may be substantially crystalline. The second reaction may proceed for a period of time between about 30 minutes and about 3 hours. The second reaction may proceed for a period of time between about 30 minutes and about 90 minutes. In some embodiments of the present disclosure, about 0.01 to about 1.0 molar equivalents of metal from the second metal phenylphosphine-containing precursor may be provided per mole of nickel provide by the first metal phenylphosphine-containing precursor. In some embodiments of the present disclosure, about 0.2 to about 0.5 molar equivalents of metal from the second metal phenylphosphine-containing precursor may be provided per mole of nickel provide by the first metal phenylphosphine-containing precursor. The second reaction step shown in Reaction 1 may be repeated one or more times to produce nanoparticles having three or more metal elements in a phosphide-containing composition; e.g. $Ni_xCo_yRu_zP_v$, $Ni_xCo_yPd_zP_v$, and any other suitable combination, where x, y, z, and v are any suitable stoichiometric values.

The invention now being generally described will be more readily understood by reference to the following examples, which are included merely for the purposes of illustration of certain aspects of the embodiments of the present invention. These examples are not intended to limit the invention, as one of skill in the art would recognize from the above teachings and the following examples that other techniques and methods can satisfy the claims and can be employed without departing from the scope of the claimed invention.

EXAMPLES

General.

Synthetic manipulations to prepare the nanoparticles (NPs) were typically conducted under a $N_2$ atmosphere using standard Schlenk techniques or in an argon filled glovebox, unless otherwise noted. Oleylamine (70%) (OAm) and 1-octadecene (ODE) were dried prior to use by heating to about 120° C. and about 150° C. under vacuum, respectively, and were stored in an argon-filled glovebox. $PPh_3$ (99%), trioctylphosphine (97%), $Ni(acac)_2$ (where acac represents acetylacetonate), $Ni(NO_3)_2 \cdot 6H_2O$, $RhCl_3 \cdot xH_2O$, $Pd(NO_3)_3 \cdot 2H_2O$, $(NH_4)H_2PO_4$, $(NH_4)_2HPO_4$, $Ni(CO)_2(PPh_3)_2$, $Rh(PPh_3)_2(CO)Cl$, and $Pd(PPh_3)_4$ were purchased and used without further purification. The silica support (Sipernat-22) was calcined at 600° C. in flowing air prior to use. The BET surface area of the calcined material was measured to be 190 m² g⁻¹, and the aqueous IW point was determined to be 3.9 mL g⁻¹. Crushed quartz (30-40 mesh) was used as a catalyst diluent material.

Synthesis of Nickel Phosphide Nanoparticles.

In a three-neck round-bottom flask fitted with a condenser and two septa, $Ni(PPh_3)_2(CO)_2$ (0.639 g, 1.0 mmol) and $PPh_3$ (1.049 g, 4.0 mmol) were combined with dried OAm (6.6 mL, 20.0 mmol) and dried ODE (6 mL), and the mixture was heated rapidly to about 320° C. (ca. 10° C./min). The temperature was maintained at about 320° C. for about 2 hours, followed by removal of the heat source and ambient cooling. About a 5 mL portion of $CHCl_3$ was added to the reaction mixture in air followed by sonication of the mixture for about 5 minutes. Approximately 15 mL of 2-propanol was added to the mixture to flocculate the crystalline metal phosphide particles ($Ni_2P$), which were then separated by centrifugation at ~8000 RPM for about 10 minutes. Aliquots (0.5 mL) of the reaction mixture were extracted during synthesis via syringe and each aliquot was purified by sonicating with about 2 mL of 2-propanol followed by centrifugation to separate the $Ni_2P$ particles.

Synthesis of Rhodium Phosphide Nanoparticles.

In a three-neck round-bottom flask fitted with a condenser and two septa, $Rh(PPh_3)_2(CO)Cl$ (691 mg, 1.00 mmol) was mixed with OAm (4.9 mL, 15.0 mmol) and ODE (8 mL) and heated to about 300° C. rapidly under $N_2$. The mixture was maintained at about 300° C. for about 1 hour, after which point the heat source was removed and the flask was allowed to naturally cool to ambient temperature. Approximately 5 mL of $CHCl_3$ was added to the mixture in air followed by about 15 mL of 2-propanol to precipitate the crystalline metal phosphide particles $Rh_2P$. These $Rh_2P$ nanoparticles were then separated by centrifugation, as described above.

Synthesis of Palladium Phosphide Nanoparticles.

In a three-neck roundbottom flask fitted with a condenser and two septa, $Pd(PPh_3)_4$ (1.16 g, 1.00 mmol) was combined with dried OAm (4.9 mL, 14.9 mmol) and dried ODE (8.0 mL), and the mixture was heated rapidly to about 300° C. The temperature was maintained at about 300° C. for about 1 hour, followed by removal of the heat source and ambient cooling. The mixture was then transferred to a centrifuge tube in air and the crystalline metal phosphide particles ($Pd_3P$) flocculated upon addition of approximately 15 mL of 2-propanol. The $Pd_3P$ particles were separated by centrifugation, as described above.

Synthesis of $(Ni_xRh_y)_2P$ Nanoparticles.

In a three-neck round-bottom flask fitted with a condenser and two septa, one molar equivalent of $Ni(PPh_3)_2(CO)_2$ and four molar equivalents of $PPh_3$ (relative to $Ni(PPh_3)_2(CO)_2$) were combined with 20 molar equivalents of dried OAm and 20 molar equivalents of dried ODE and the mixture was heated rapidly to about 250° C. (ca. 10° C./min). The temperature was maintained at about 250° C. for about 15 minutes to produce a reaction mixture containing amorphous nickel phosphide nanoparticles. The addition of 0.25 molar equivalents of $Rh(PPh_3)_2(CO)Cl$ to the cooled reaction mixture, followed by heating to 300° C. for 1 h resulted in solid, crystalline $(Ni_xRh_y)_2P$ NPs, where, for this example, x is about 0.8, and y is about 0.2. About a 5 mL portion of $CHCl_3$ was added to the reaction mixture in air followed by sonication of the mixture for about 5 minutes. Approximately 15 mL of 2-propanol was added to the mixture to flocculate the $(Ni_{0.8}Rh_{0.2})_2P$ nanoparticles, which were then separated by centrifugation at ~8000 RPM for about 10 minutes.

Synthesis of $(Ni_xMo_y)_2P$ Nanoparticles.

In a three-neck round-bottom flask fitted with a condenser and two septa, one molar equivalent of $Ni(PPh_3)_2(CO)_2$ and four molar equivalents of $PPh_3$ (relative to $Ni(PPh_3)_2(CO)_2$) were combined with 20 molar equivalents of dried OAm and 20 molar equivalents of dried ODE and the mixture was heated rapidly to about 250° C. (ca. 10° C./min). The temperature was maintained at about 250° C. for about 15 minutes to produce a reaction mixture containing amorphous nickel phosphide nanoparticles. The reaction mixture was then removed from the heat source and cooled to about 30° C. After cooling, in a first experiment, about 0.25 molar equivalents of $Mo(PPh_3)_2(CO)_4$ was added to the reaction mixture and the mixture was heated rapidly to about 300° C. (ca. 10° C./min), where 0.25 molar equivalents of $Mo(PPh_3)_2(CO)_4$ is relative to one molar equivalent of $Ni(PPh_3)_2(CO)_2$ used in the first reaction step. The second reaction temperature was maintained at about 300° C. for about 60 minutes to produce a reaction mixture containing crystalline $(Ni_xMo_y)_2P$ nanoparticles, where, for this example, x is about 0.8, and y is about 0.2. About a 5 mL portion of $CHCl_3$ was added to the reaction mixture in air followed by sonication of the mixture for about 5 minutes. Approximately 15 mL of 2-propanol was added to the mixture to flocculate the $(Ni_{0.8}Mo_{0.2})_2P$ nanoparticles, which were then separated by centrifugation at ~8000 RPM for about 10 minutes.

Synthesis of $(Ni_xRu_y)_2P$ Nanoparticles.

In a three-neck round-bottom flask fitted with a condenser and two septa, one molar equivalent of $Ni(PPh_3)_2(CO)_2$ and four molar equivalents of $PPh_3$ (relative to $Ni(PPh_3)_2(CO)_2$) were combined with 20 molar equivalents of dried OAm and 20 molar equivalents of dried ODE and the mixture was heated rapidly to about 250° C. (ca. 10° C./min). The temperature was maintained at about 250° C. for about 15 minutes to produce a reaction mixture containing amorphous nickel phosphide nanoparticles. The reaction mixture was then removed from the heat source and cooled to about 30° C. After cooling, about 0.25 molar equivalents of $Ru(PPh_3)_2(CO)_2Cl_2$ or $Ru(PPh_3)_3Cl_2$ was added to the reaction mixture (two experiments completed; molar equivalence relative to one mole of $Ni(PPh_3)_2(CO)_2$ from the first reaction step) and the mixture was heated rapidly to about 300° C. (ca. 10° C./min). This second reaction temperature was maintained at about 300° C. for about 60 minutes to produce a reaction mixture containing crystalline $(Ni_xRu_y)_2P$ nanoparticles, where, for this example, x is about 0.8, and y is about 0.2. About a 5 mL portion of $CHCl_3$ was added to the reaction mixture in air followed by sonication of the mixture for about 5 minutes. Approximately 15 mL of 2-propanol was added to the mixture to flocculate the $(Ni_{0.8}Ru_{0.2})_2P$ nanoparticles, which were then separated by centrifugation at ~8000 RPM for about 10 minutes.

Synthesis of $(Ni_xCo_y)_2P$ Nanoparticles.

In a three-neck round-bottom flask fitted with a condenser and two septa, one molar equivalent of $Ni(PPh_3)_2(CO)_2$ and four molar equivalents of $PPh_3$ (relative to $Ni(PPh_3)_2(CO)_2$) were combined with 20 molar equivalents of dried OAm and 20 molar equivalents of dried ODE and the mixture was heated rapidly to about 250° C. (ca. 10° C./min). The temperature was maintained at about 250° C. for about 15 minutes to produce a reaction mixture containing amorphous nickel phosphide nanoparticles. The reaction mixture was then removed from the heat source and cooled to about 30°

C. After cooling, about 0.25 molar equivalents of Co(PPh$_3$)(CO)$_2$(NO) was added to the reaction mixture and the mixture was heated rapidly to about 300° C. (ca. 10° C./min). This second reaction temperature was maintained at about 300° C. for about 60 minutes to produce a reaction mixture containing crystalline (Ni$_x$Co$_y$)$_2$P nanoparticles, where, for this example, x is about 0.8, and y is about 0.2. About a 5 mL portion of CHCl$_3$ was added to the reaction mixture in air followed by sonication of the mixture for about 5 minutes. Approximately 15 mL of 2-propanol was added to the mixture to flocculate the (Ni$_{0.8}$Co$_{0.2}$)$_2$P nanoparticles, which were then separated by centrifugation at ~8000 RPM for about 10 minutes.

Synthesis of (Ni$_x$Pd$_y$)$_2$P Nanoparticles.

In a three-neck round-bottom flask fitted with a condenser and two septa, one molar equivalent of Ni(PPh$_3$)$_2$(CO)$_2$ and four molar equivalents of PPh$_3$ (relative to Ni(PPh$_3$)$_2$(CO)$_2$) were combined with 20 molar equivalents of dried OAm and 20 molar equivalents of dried ODE and the mixture was heated rapidly to about 250° C. (ca. 10° C./min). The temperature was maintained at about 250° C. for about 15 minutes to produce a reaction mixture containing amorphous nickel phosphide nanoparticles. The reaction mixture was then removed from the heat source and cooled to about 30° C. After cooling, about 0.25 molar equivalents of Pd(PPh$_3$)$_4$ was added to the reaction mixture and the mixture was heated rapidly to about 300° C. (ca. 10° C./min). This second reaction temperature was maintained at about 300° C. for about 60 minutes to produce a reaction mixture containing crystalline (Ni$_x$Pd$_y$)$_2$P nanoparticles, where, for this example, x is about 0.8, and y is about 0.2. About a 5 mL portion of CHCl$_3$ was added to the reaction mixture in air followed by sonication of the mixture for about 5 minutes. Approximately 15 mL of 2-propanol was added to the mixture to flocculate the (Ni$_{0.8}$Pd$_{0.2}$)$_2$P nanoparticles, which were then separated by centrifugation at ~8000 RPM for about 10 minutes.

Synthesis of Silica Supported Nanoparticles.

The recovered nanoparticles were redispersed in about 10 mL of CHCl$_3$ and added dropwise to a suspension of a silica support (Sipernat-22) in CHCl$_3$ (1 g/mL), in order to yield a catalyst with about 5 wt % metal or metal phosphide loading. The mixture was sonicated for about 5 minutes, and stirred overnight. The resulting catalyst was separated via centrifugation, dried in vacuo, and stored under an Ar atmosphere. The silica supported nanoparticle catalysts were not reduced prior to reaction testing.

Characterization.

Powder X-ray diffraction (XRD) data were collected using a Rigaku Ultima IV diffractometer with a Cu Kα source (40 kV, 44 mA). Diffraction patterns were collected in the 2θ range of 20-80 degrees at a scan rate of 4°/min. Samples (10-20 mg) were supported on a glass sample holder with a 0.2 mm recessed sample area and were pressed into the recession with a glass slide to obtain a uniform z-axis height. Patterns were compared to powder diffraction files (PDFs) from the International Center for Diffraction Data (ICDD). The crystallite sizes were calculated from XRD peak broadening of the unsupported catalysts using the Scherrer equation. Samples for TEM were dropcast onto carbon-coated copper grids from chloroform suspensions. Imaging was performed using a FEI Tecnai G2 ST20 TEM operating at 200 kV and all image analysis was conducted using standard imaging software. Size distributions were determined from an automated area analysis of >100 particles. The measured areas were converted to diameters by assuming a circular nanoparticle cross-section for Ni, Ni$_2$P, and Pd$_3$P, and a square cross-section for Rh$_2$P. Elemental analysis was performed using inductively coupled plasma optical emission spectroscopy (ICP-OES).

Catalytic reaction testing.

Temperature-programmed reaction (TPRxn) experiments were carried out in a U-shaped quartz tube at atmospheric pressure. The reactor was equipped with an inline mass spectrometer (MS) to monitor reactants and products in real time. The observed products included CO, CH$_4$, H$_2$O, CO$_2$, acetaldehyde, acetone, ethylene, and ketene. The detailed data analysis method is described further below. For each experiment, the catalyst (50 mg) was mixed with quartz chips (50 mg, 30-40 mesh) and loosely packed into the reactor with quartz wool. The reactor was purged with He at 40 mL/min until no MS signal for O$_2$ was observed. Acetic acid vapor was delivered in a stream of He via an inline bubbler, and hydrogen was delivered separately to give a gas mixture having ~2.3 vol % acetic acid and ~5.9 vol % H$_2$ (H$_2$/acetic acid molar ratio of 2.5) at a total flow rate of about 43.5 mL/min. After stabilization of the reactant signals on the MS, the reactor was heated from room temperature to 600° C. at 10° C./min, and then allowed to cool to room temperature. Temperature programmed reduction (TPR) experiments were performed similarly to the TPRxn experiments, but in the absence of acetic acid vapor. The reduction gas was a mixture of ~2% H$_2$ in He, delivered at a flow rate of about 20.4 mL/min.

Results

Metal Phosphide Nanoparticle Synthesis.

Figure 2:
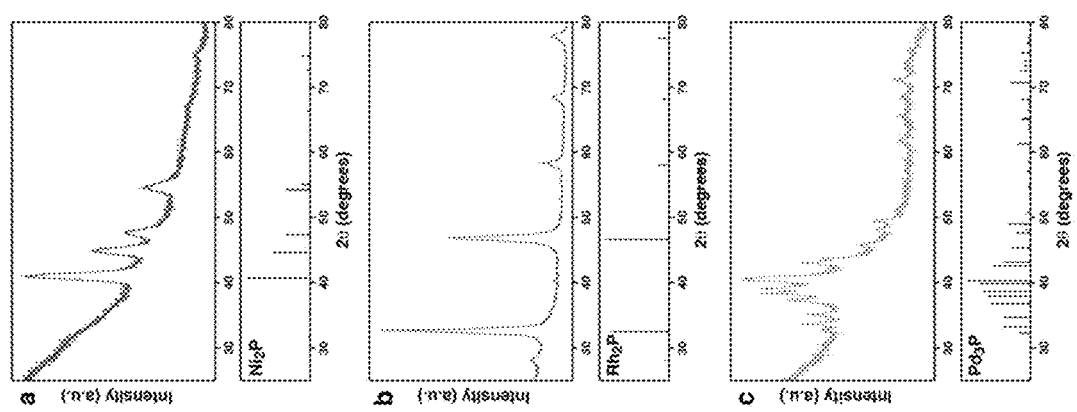
FIG. 2 illustrates X-ray diffraction (XRD) patterns of crystalline metal phosphide nanoparticles produced according to embodiments of the present disclosure; (Panel a) $Ni_2P$, (Panel b) $Rh_2P$, and (Panel c) $Pd_3P$ with corresponding reference patterns below.

The rapid (1-2 h) solution-based thermal decomposition of Ni(PPh$_3$)$_2$(CO)$_2$, Rh(PPh$_3$)$_2$(CO)Cl, or Pd(PPh$_3$)$_4$, at low temperatures (300-320° C.) in the presence of OAm gave crystalline Ni$_2$P, Rh$_2$P, and Pd$_3$P NPs, respectively, as shown in the TEM images in FIG. 1. During thermal decomposition in the presence of OAm, the precursors remain insoluble until 120° C. (200° C. for Rh(PPh$_3$)$_2$(CO)Cl), at which time they undergo dissolution without any significant color change or gas evolution. Furthermore, precursor decomposition was not observed until around 250° C., which is in the regime where a M-P intermediate phase may form directly. All of the metal phosphide nanoparticles are single crystalline and solid without a hollow center. The solid, single crystalline nature of the nanoparticles is important for correlating catalyst structural features with catalytic performance. The Ni$_2$P (10.7±1.3 nm) and Pd$_3$P (4.0±0.8 nm) nanoparticles exhibit a spherical morphology. The high resolution TEM (HRTEM) images, inset, show a lattice spacing of 0.31 nm for the Ni$_2$P NPs (FIG. 1—Panel a) and 0.23 nm for the Pd$_3$P (FIG. 1—Panel c), which correspond to the (001) and (220) crystal planes of Ni$_2$P and Pd$_3$P, respectively. In contrast to the other materials, the Rh$_2$P nanoparticles (10.3±2.8 nm) adopt a cubic shape with a characteristic lattice spacing of 0.28 nm corresponding to the (200) planes of Rh$_2$P. Analysis using XRD (FIG. 2—Panels a-c) demonstrates that the materials are of the metal-rich crystalline phases Ni$_2$P (PDF 01-089-2742), Rh$_2$P (PDF 03-065-0350), and Pd$_3$P (PDF 03-065-2415) without any observed crystalline phosphide, oxide, or metallic impurities.

The Ni$_2$P and Pd$_3$P nanoparticles can be indexed to hexagonal crystal phases, whereas the cubic crystal phase of the Rh$_2$P nanoparticles likely leads to the predominantly cubic morphology observed by TEM in FIG. 1 (Panel b). Elemental analyses of the silica-supported metal phosphide nanoparticles indicate a slightly P-rich composition relative to the expected bulk stoichiometry. The Ni$_2$P and Rh$_2$P nanoparticles contained 36.7 and 48.8 mol % P (33.3 mol % expected), respectively, and the $Pd_3P$ nanoparticles contained 34.7 mol % P (25.0 mol % expected). The greater P content is attributed to residual $PPh_3$ from the P-rich precursors.

Figure 3:
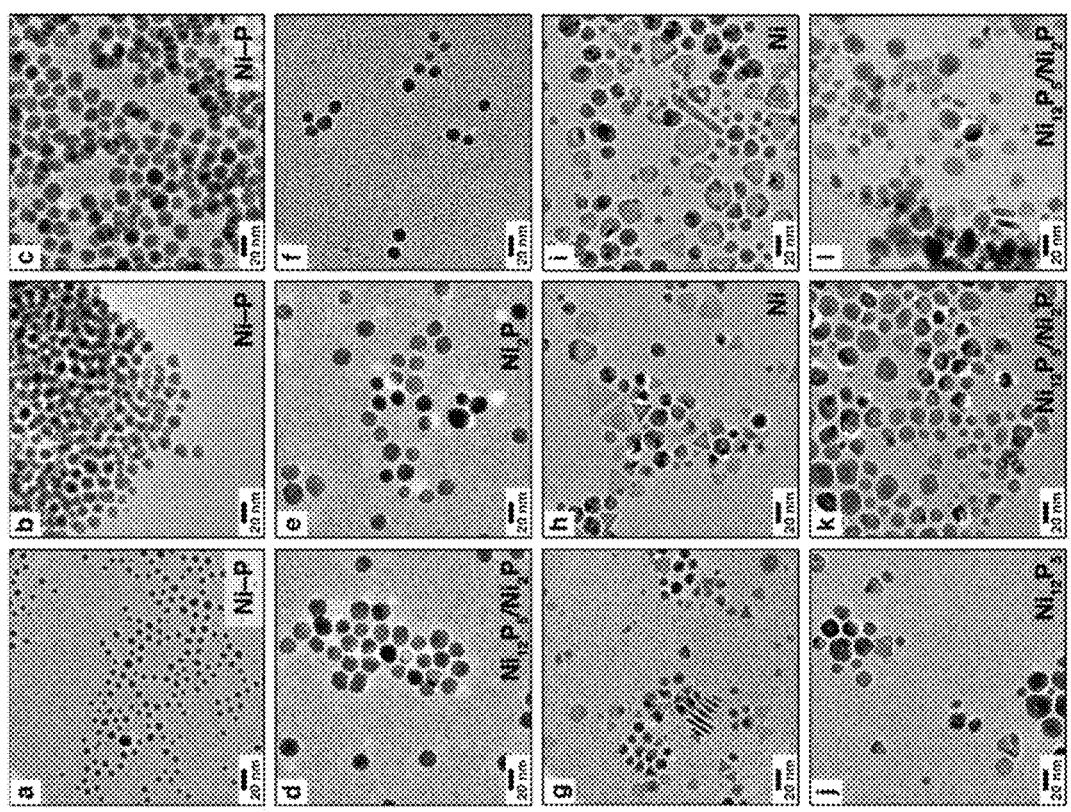
FIG. 3 illustrates TEM images of purified samples of reaction mixtures taken at various temperatures during the decomposition of $Ni(PPh_3)_2(CO)_2$ in oleylamine (OAm)/octadecene (ODE) under standard conditions with 4 equivalents of $PPh_3$ according to embodiments of the present disclosure at; (Panel a) 250° C., (Panel b) amorphous nickel phosphide at 275° C., (Panel c) amorphous nickel phosphide at 300° C., (Panel d) crystalline nickel phosphide at 320° C., and (Panel e) crystalline nickel phosphide after 2 hours at 320° C.; and TEM images of the same reaction mixtures in the absence of excess $PPh_3$ according to embodiments of the present disclosure at; at (Panel f) 150° C., (Panel g) 200° C., (Panel h) crystalline nickel metal at 225° C., (Panel i) crystalline nickel metal at 275° C., (Panel j) crystalline nickel phosphide at 300° C., (Panel k) crystalline nickel phosphide at 320° C., and (Panel l) crystalline nickel phosphide after 2 hours at 320° C.

In these examples, the $Rh_2P$ and $Pd_3P$ nanoparticles were prepared from single-source $Rh(PPh_3)_2(CO)Cl$ and $Pd(PPh_3)_4$ precursors, without the addition of excess organophosphine reagent such as $PPh_3$ or trioctylphosphine. In contrast, in the example of synthesis of $Ni_2P$ nanoparticles from $Ni(PPh_3)_2(CO)_2$ an additional 4 equivalents of $PPh_3$ was used to prevent the formation of mixed phase $Ni_2P/Ni_{12}P_5$ nanoparticles. A P:Ni ratio of about 6.0, used in this example, promoted the formation of amorphous nickel phosphide nanoparticles that crystalize at higher temperatures. The formation temperature for the amorphous nanoparticles may be dependent upon the stoichiometric excess of $PPh_3$. Aliquots of reactions performed with and without excess $PPh_3$ were removed at various temperatures and purified for analysis by TEM and XRD. With the addition of 4 equivalents of $PPh_3$, the onset of amorphous nanoparticle formation occurs at approximately 250° C. At this temperature, the reaction mixture darkened, and the TEM image of an aliquot from the mixture reveals that solid nanoparticles (5.5±1.0 nm) with spherical morphologies have formed (FIG. 3—Panel a). Analysis of a sample taken at 250° C. by XRD (FIG. 4—Panel a), however, does not show any diffraction patterns associated with Ni, $Ni_2P$, or $Ni_{12}P_5$, indicating that the observed nanoparticles are likely amorphous or very poorly crystalline. As the temperature of the reaction was raised to 275, 300, and 320° C., the nanoparticles increase in size to 10.1±1.4, 13.5±1.6, and 15.6±2.0 nm, respectively (FIG. 3 Panels b-d). During the 2 hour aging process at 320° C., the size of the nanoparticles decreased to 14.1±2.0 nm, as shown in FIG. 3 (Panel e). Analysis of these reaction aliquots by XRD (FIG. 4—Panel a) indicates that the nanoparticles appear to remain amorphous until the temperature reaches 320° C. Upon initially reaching this temperature, the primary crystalline phase appears to be $Ni_2P$ with a minor fraction of $Ni_{12}P_5$, indicated by a shoulder at 49.0°, and after 2 hrs at 320° C. substantially all of the $Ni_{12}P_5$ was converted to $Ni_2P$.

Figure 4:
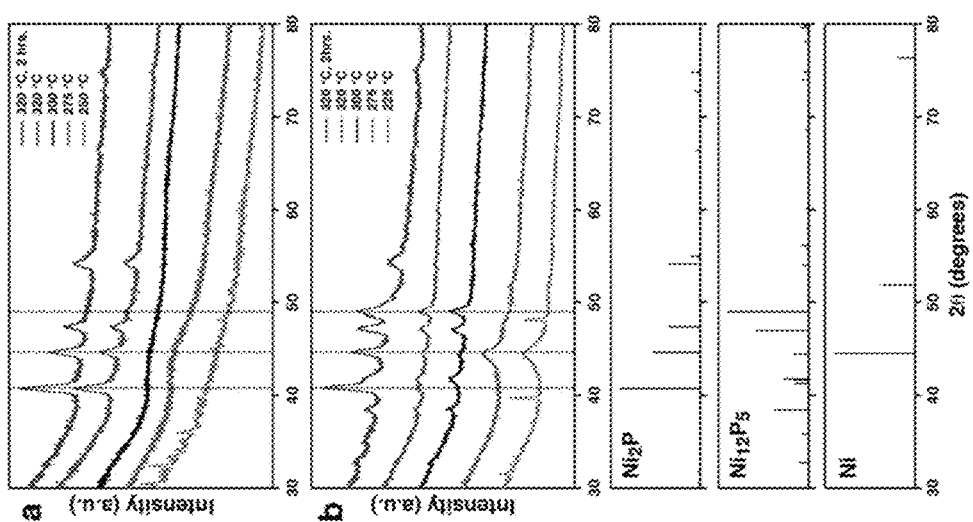
FIG. 4 illustrates XRD patterns of purified samples of reaction mixtures taken at various temperatures during the decomposition of $Ni(PPh_3)_2(CO)_2$ in OAm/ODE under standard conditions with 4 equivalents of $PPh_3$ (Panel a) and in the absence of excess $PPh_3$ (Panel b) according to embodiments of the present disclosure. The first aliquot was taken when significant precursor decomposition began to occur and the final aliquot was taken two hours after the reaction mixture reached 320° C. Reference patterns are shown below, and dotted lines on the experimental patterns indicate the highest intensity peak for crystalline $Ni_1P$, $Ni_{12}P_5$, and Ni.

Without the addition of $PPh_3$, rapid darkening of the reaction mixture began as early as 150° C. due to the apparent formation of a polydisperse mixture of nanoparticles (FIG. 3—Panel f) that formed a combination of faceted nanoparticles and hexagonal and triangular plates as the temperature was increased to about 200° C. and then 225° C. (FIG. 3—Panels g and h). The XRD patterns undergo a sharp transition from a crystalline nickel complex at 200° C. (XRD pattern not shown) to crystalline Ni nanoparticles at 225° C. (FIG. 4—Panel b). The sharp peaks at 40 and 48° 2θ may be from a residual crystalline Ni complex that is not an identical match for $Ni(CO)_2(PPh_3)_2$. As the temperature was increased to 275° C., the Ni plates began to lose density at their centers (FIG. 3—Panel i) as phosphidation began to occur. The XRD pattern at this temperature (FIG. 2—Panel b) exhibits a slight shoulder at 47.5° 2θ, which resolves into the pattern for $Ni_{12}P_5$ at 300° C., with no apparent significant contribution from $Ni_2P$. As the temperature is increased to 320° C., increased phosphidation led to a mixture of $Ni_{12}P_5$ and $Ni_2P$ that persisted with increased crystallinity after 2 hours at 320° C. During phosphidation, the nanoparticles assumed a more spherical morphology with void spaces at the core, characteristics of phosphidation of metal nanoparticles, as seen in FIG. 3—Panels j and k. The final mixed-phase nanoparticles were polydisperse with solid cores (FIG. 3—Panel l).

Figure 5:
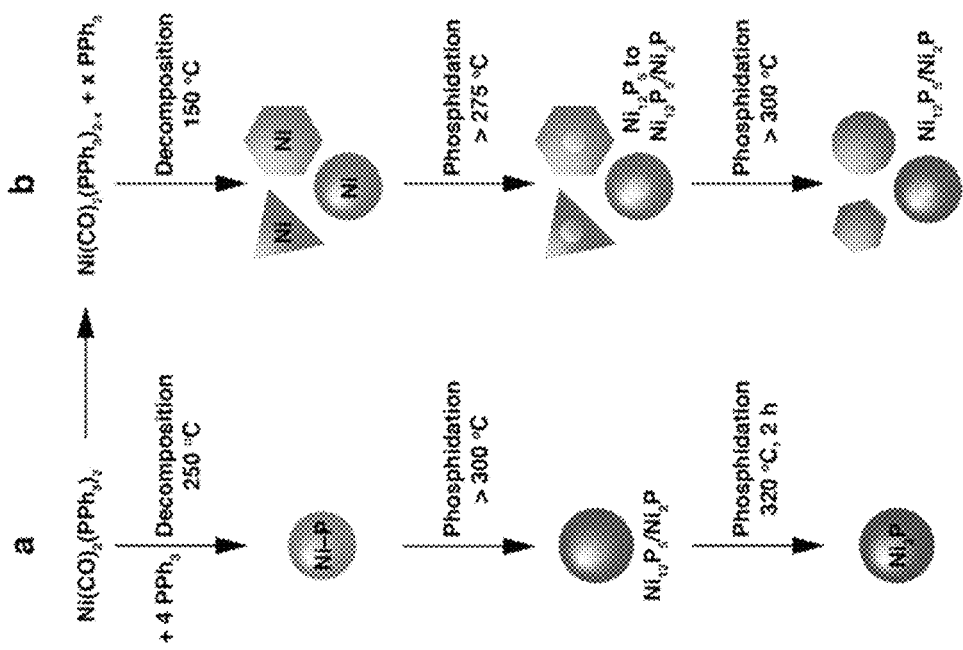
FIG. 5 illustrates possible decomposition and nanoparticle formation pathways for the single-source precursor $Ni(PPh_3)_2(CO)_2$ with the addition of excess $PPh_3$ (Route a) and without the addition of excess $PPh_3$ (Route b), according to embodiments of the present disclosure.

Without wishing to be bound by theory, it may be hypothesized that the addition of excess $PPh_3$ stabilizes the molecular precursor, as shown in FIG. 5, which may shift the equlibrium towards pathway (a) and enable decomposition to take place at a higher temperature (~250° C.). At such higher temperatures, the formation of amorphous nickel phosphide precursor nanoparticles may be favored over nickel nanoparticles, and the amorphous nickel phosphide nanoparticles may be more readily converted to crystalline $Ni_2P$ in the presence of excess $PPh_3$. Analysis of the reaction mixture containing excess $PPh_3$ by XRD as a function of time suggests that $Ni_2P$ and $Ni_{12}P_5$ may form simultaneously at >300° C., and over time the small fraction of $Ni_{12}P_5$ may be converted into $Ni_2P$ by further phosphidation. In the absence of additional $PPh_3$, loss of $PPh_3$ from the precursor may lead to decomposition at a lower temperature (~150° C.). At this temperature faceted metallic Ni nanoparticles may be formed via pathway (b), and above 275° C. phosphidation may begin to occur to give hollow crystalline $Ni_{12}P_5$ nanoparticles and then hollow mixed-phase $Ni_{12}P_5/Ni_2P$ nanoparticles. In the absence of additional $PPh_3$, full conversion to $Ni_2P$ may not be achieved within about 2 hours, and the P-deficient $Ni_{12}P_5$ phase may remain the major component of the final solid nanoparticles. The diffraction peaks associated with $Ni_2P$ arise slowly over time suggesting that, in the absence of additional $PPh_3$, the formation of $Ni_{12}P_5$ may be more favorable and only at extended reaction times may the formation of any $Ni_2P$ observed.

Acetic Acid Hydrogenation.

TPRxn testing was performed on the nanoparticles and corresponding IW catlaysts at atmospheric pressure from about 200° C. to about 500° C. with an $H_2$/acetic acid molar ratio of about 2.5, in order to investigate $H_2$ activation and deoxygenation pathways under conditions that are relevant to the deoxygenation of bio-oil vapors directly following fast pyrolysis (350-450° C., low pressure, and near stoichiometric $H_2$ concentrations). Acetic acid is useful probe molecule because it can undergo a variety of transformations (eq. 1-9) that can provide insight into differences in reactivity between metal and metal phosphide catalysts (e.g., gasification, decarbonylation, ketonization, dehydration).

Figure 9:
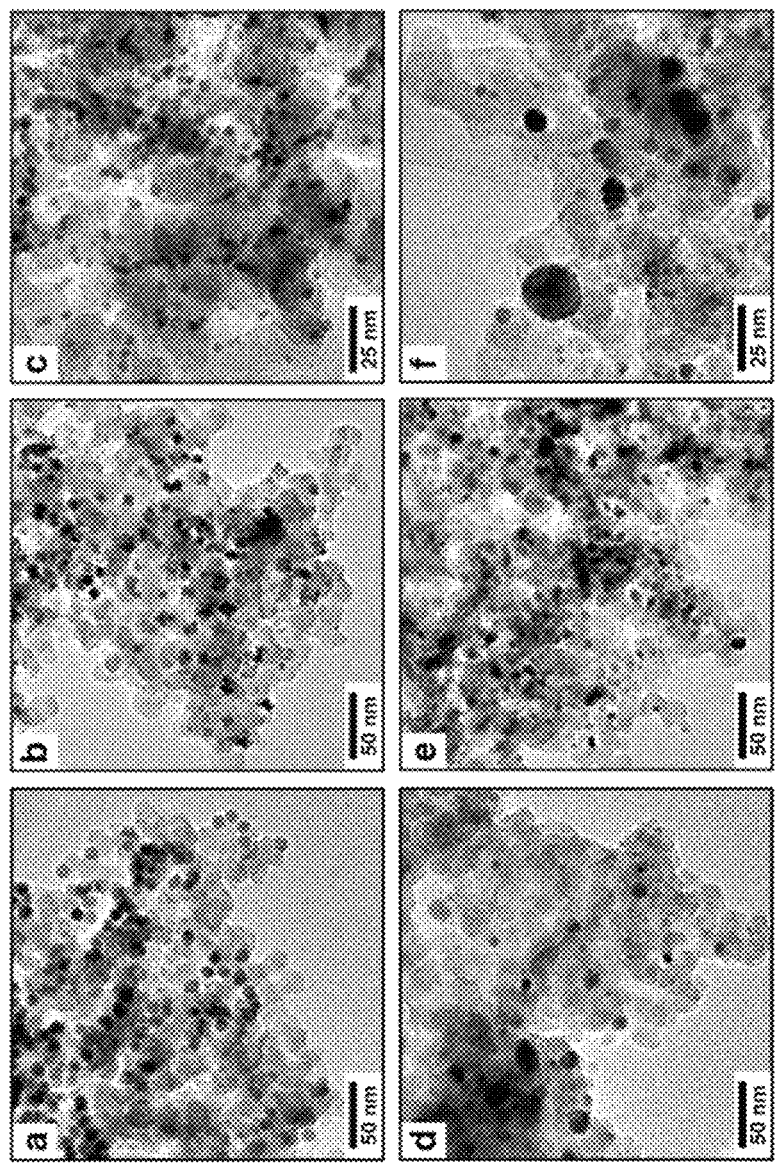
FIG. 9 illustrates TEM images of silica-supported crystalline metal phosphide nanoparticles (NPs) produced according to embodiments of the present disclosure, compared with supported catalysts prepared by IW; (Panel a) NP-$Ni_2P/SiO_2$, (Panel b) NP-$Rh_2P/SiO_2$, (Panel c) NP-$Pd_3P$, (Panel d) IW-$Ni/SiO_2$, (Panel e) IW-$Rh/SiO_2$, and (Panel f) IW-$Pd/SiO_2$.
Figure 10:
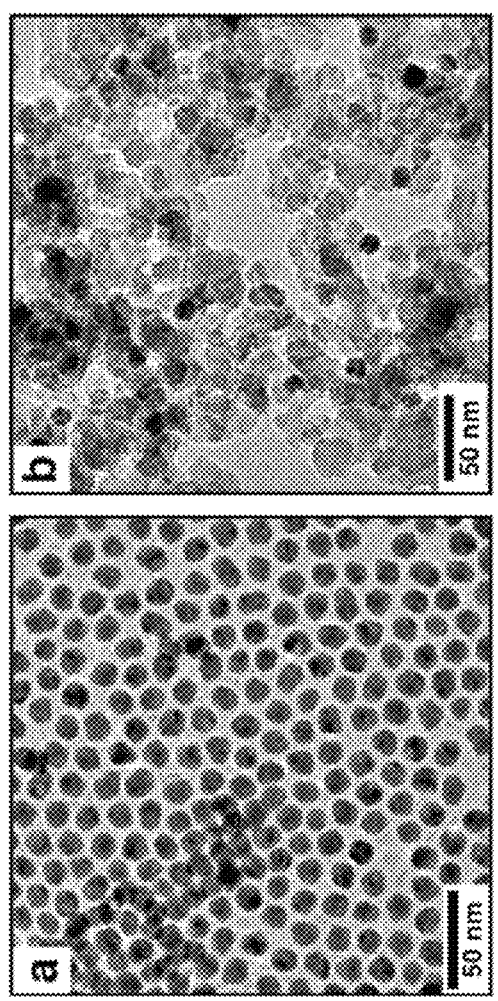
FIG. 10 illustrates TEM images of crystalline metal nanoparticles produced according to embodiments of the present disclosure; (Panel a) Ni nanoparticles, and (Panel b) Ni nanoparticles supported on silica.

Prior to reaction testing, the nanoparticles were supported on a high surface area (190 $m^2/g$) silica support. The supported crystalline metal phosphide nanoparticles were well dispersed on the silica support with no change in morphology observed by TEM (FIG. 9). Similarly, the crystalline Ni nanoparticles retain their original size and shape throughout the procedure of depositing the nanoparticles on the silica support (FIG. 10). For comparison, metal IW catalysts were prepared on the same silica support. The IW metal catalysts were phase pure after reduction according to XRD analysis, but exhibited greater size dispersion than the nanoparticle catalysts (FIG. 9).

Figure 6:
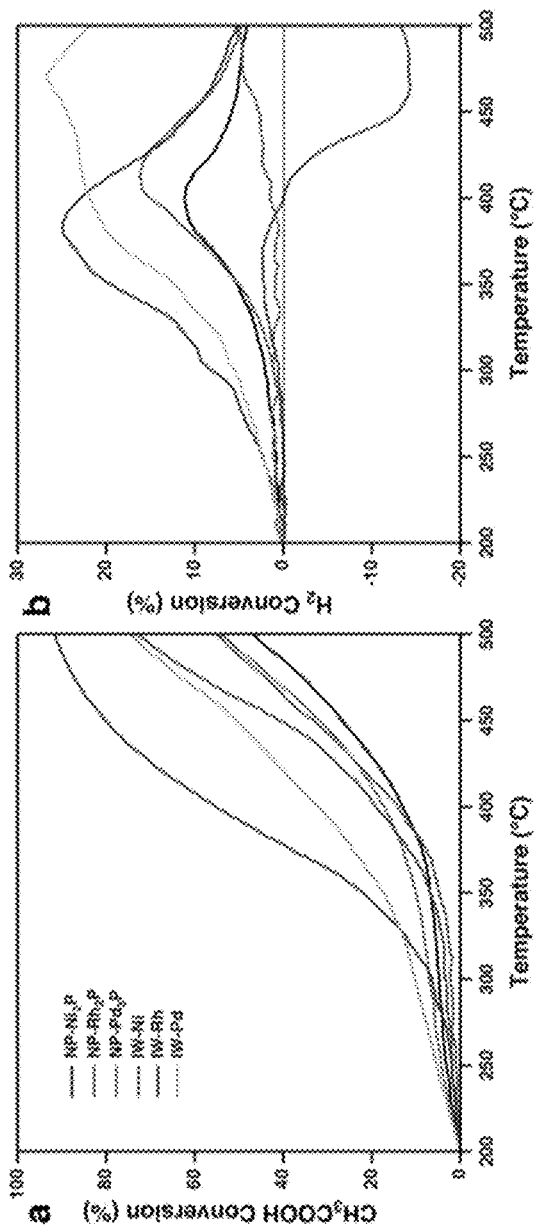
FIG. 6 illustrates temperature programmed reaction (TPRxn) data for acetic acid hydrogenation over the supported metal phosphide nanoparticle catalysts, according to embodiments of the present disclosure, and corresponding metal incipient wetness (IW) catalysts including; temperature-dependent conversion of acetic acid (Panel a) and hydrogen (Panel b).

FIG. 6 presents acetic acid (Panel a) and $H_2$ (Panel b) conversion for the NP-metal phosphide catalysts and the corresponding IW-metal catalysts. All of the catalysts demonstrate significant conversion of acetic acid beginning at or below 350° C. The IW-Rh catalyst exhibits the lowest onset temperature for acetic acid conversion, beginning around 300° C., and the highest activity for acetic acid conversion, reaching a maximum of 90% by 500° C. The IW-Pd catalyst also exhibits a high rate of conversion beginning at 350° C. Overall, the IW-metal catalysts demonstrate the highest rates of conversion relative to the NP-metal phosphide catalysts.

Figure 11:
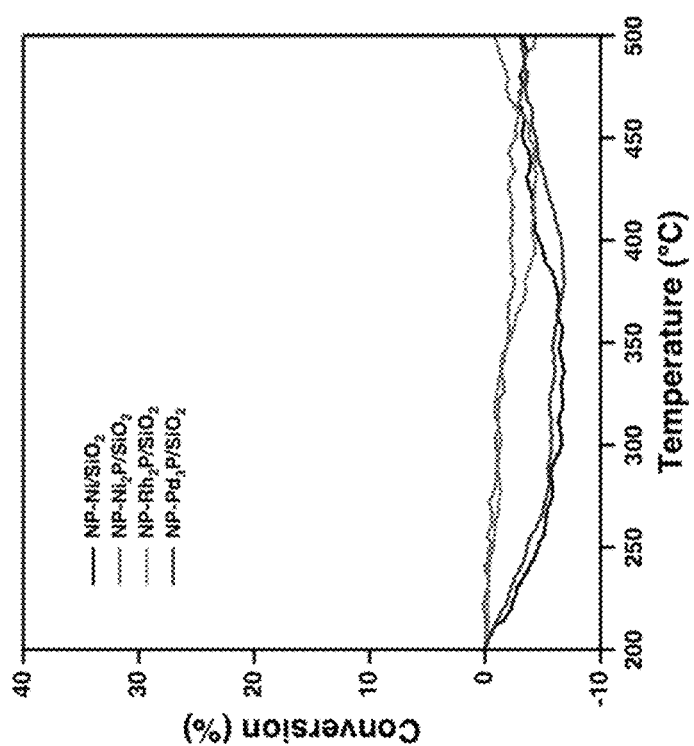
FIG. 11 illustrates hydrogen conversion during TPR of supported metal phosphide nanoparticle catalysts and nanoparticle nickel catalyst, according to embodiments of the present disclosure.

Activation of $H_2$ is an important function for catalysts that operate at low pressure and near stoichiometric $H_2$ concentrations, and the incorporation of hydrogen into reaction products is necessary for most desired deoxygenation processes. In control experiments, none of the supported crystalline NP catalysts exhibit any $H_2$ consumption, and in fact, exhibit minor $H_2$ production in the absence of acetic acid (FIG. 11). Therefore, $H_2$ consumed in the presence of acetic acid is incorporated into conversion products, rather than facilitating reduction of the NPs or surface ligands. For the Ni—$Ni_2P$ and NP-$Rh_2P$ catalysts, the onset of $H_2$ consumption is concurrent with the onset of acetic acid conversion, and begins around 350° C. (FIG. 6). In agreement with the acetic acid conversion data, the IW-Rh catalyst exhibits a sharp rise in consumption of $H_2$ above 300° C., and the IW-Pd catalyst exhibits a sharp rise in conversion after 350° C. In contrast, minimal $H_2$ consumption is observed over NP-$Pd_3P$ and IW-Ni. Further, the IW-Ni catalyst evolves $H_2$ above 400° C. The generation of $H_2$ is attributed to acetic acid gasification ($CH_3COOH \rightarrow 2CO+2H_2$). In all cases, the conversion of acetic acid continues to increase with temperature while $H_2$ consumption reaches a maximum around 400° C. for NP-$Ni_2P$, NP-$Rh_2P$, and IW-Rh and above 450° C. for IW-Pd. Table 1 provides conversion ratios for $H_2$/acetic acid at various temperatures. A $H_2$/acetic acid ratio of one implies that much of acetic acid conversion involves hydrogen incorporation, and a ratio of zero or a negative value indicates minimal hydrogen incorporation or evolution of $H_2$, respectively. These ratios may be convoluted by simultaneous $H_2$ consumption and evolution, and/or reactions that consume or evolve more than one molecule of $H_2$, such as gasification. However, general trends suggest that NP-$Ni_2P$ and NP-$Rh_2P$ (and to a lesser extent IW-$Ni_2P$ and IW-$Rh_2P$, vide infra) effectively incorporate $H_2$ at 350 and 400° C., while the NP-$Pd_3P$ and IW-Ni are ineffective at these temperatures, with the IW-Ni starting to produce $H_2$ at 450 and 500° C. The IW-Rh catalyst is most effective at 300 and 350° C., and the IW-Pd at 350 and 400° C., although IW-Pd retains the most $H_2$ incorporation at 450 and 500° C.

TABLE 1

| | $H_2$/acetic acid conversion ratio at specified T (° C.) | | | | |
|---|---|---|---|---|---|
| Catalyst | 300 | 350 | 400 | 450 | 500 |
| NP-$Ni_2P$ | 0.4 | 0.8 | 0.9 | 0.2 | 0.1 |
| NP-$Rh_2P$ | 0.5 | 1.1 | 1.1 | 0.3 | 0.1 |
| NP-$Pd_3P$ | 0.1 | 0.1 | 0.1 | 0.1 | 0.1 |
| IW-Ni | 0.2 | 0.3 | 0.0 | −0.3 | −0.2 |
| IW-Rh | 1.3 | 0.9 | 0.4 | 0.1 | 0.1 |
| IW-Pd | 0.5 | 0.7 | 0.7 | 0.5 | 0.3 |
| NP-Ni | 0.0 | 0.0 | −0.3 | −0.4 | −0.2 |
| IW-$Ni_2P$ | 0.5 | 0.9 | 0.6 | 0.3 | 0.0 |
| IW-$Rh_2P$ | 0.8 | 1.0 | 0.8 | 0.4 | 0.2 |

Figure 12:
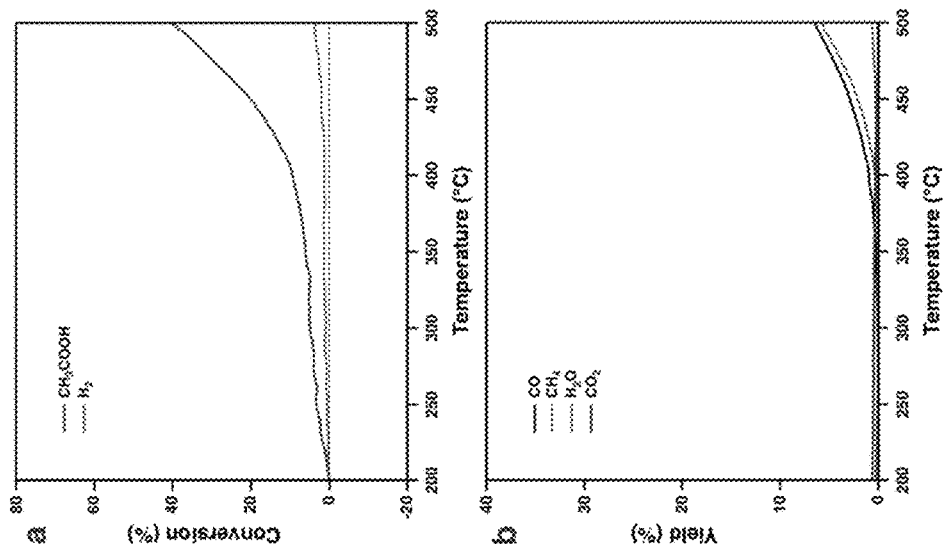
FIG. 12 illustrates TPRxn data for acetic acid hydrogenation over the silica support, according to embodiments of the present disclosure.

Decomposition reactions, such as decarbonylation ($CH_3COOH+H_2 \rightarrow CO+CH_4+H_2O$) and decarboxylation ($CH_3COOH \rightarrow CO_2+CH_4$), that result from C—C bond scission are thermodynamically favored over the production of ethanol via hydrogenation-dehydration ($CH_3COOH+2H_2 \rightarrow CH_3CH_2OH+H_2O$). It has also been demonstrated that silica-supported noble metals favor the decarbonylation reaction almost exclusively at low $H_2$ pressures. Here, the acetic acid decomposition product CO is a dominant product in all cases, as shown in FIG. 6—Panel (a). This can be attributed to gasification over IW-Ni, where $H_2$ and CO are formed concurrently above 400° C. In the other cases, with the exception of NP-$Pd_3P$, consumption of $H_2$ is concomitant with CO production suggesting a hydrogen-assisted decarbonylation pathway. This reaction proceeds with maximum production rates of $CH_4$ (FIG. 6—Panel (b)) around 400 and 415° C. for NP-$Ni_2P$ and NP-$Rh_2P$, respectively, at 380° C. for IW-Rh, and at 400 and 465° C. for IW-Pd, lending further support to the prevalence of hydrogen-assisted decarbonylation. The NP-$Rh_2P$ produces the highest yield of $CH_4$ (16%) along with a nearly stoichiometric CO yield at this temperature, giving a CO/$CH_4$ molar ratio of 1.2. Similarly, the NP-$Ni_2P$ exhibits a CO/$CH_4$ ratio of 1.6 at 400° C., although the maximum yield of CO occurs at 420° C., above the highest yield of $CH_4$. In contrast, IW-Rh exhibits a CO/$CH_4$ ratio of 2.5, indicating that competing reactions are occurring simultaneously. At 400° C., IW-Pd exhibits a CO/$CH_4$ ratio of 1.7, and a ratio of 2.5 at 465° C., suggesting that competing reactions occur more readily over the IW-metal catalysts relative to the NP-metal phosphide catalysts. The bare silica support performs similarly to the NP-$Pd_3P$, with conversion of acetic acid beginning around 350° C., minimal consumption (FIG. 12—Panel a), and production of CO and $H_2O$ in less than 10% yields (FIG. 12—Panel b). These results indicate that NP-$Pd_3P$ has minimal catalytic impact on productive reactions of acetic acid under these conditions, and behaves similarly to the bare silica support. Acetic acid conversion over both NP-$Pd_3P$ and the silica support, without significant product yields, suggest that coke formation via dehydration of acetic acid and/or methane decomposition may play a primary role in these cases. The non-stoichiometric yields of CO and $CH_4$, along with lower than expected production of $H_2O$ (FIG. 7—Panel c) required for decarbonylation, suggest that gasification to produce CO and $H_2$ is proceeding concurrently with decarbonylation at higher temperatures. Gasification is favored by the IW-metal catalysts over the NP-$Ni_7P$ and NP-$Rh_2P$ catalysts. Additionally, secondary reactions that consume $CH_4$ and $H_2O$ such as methane decomposition and methane steam reforming are likely to occur at higher temperatures.

Figure 7:
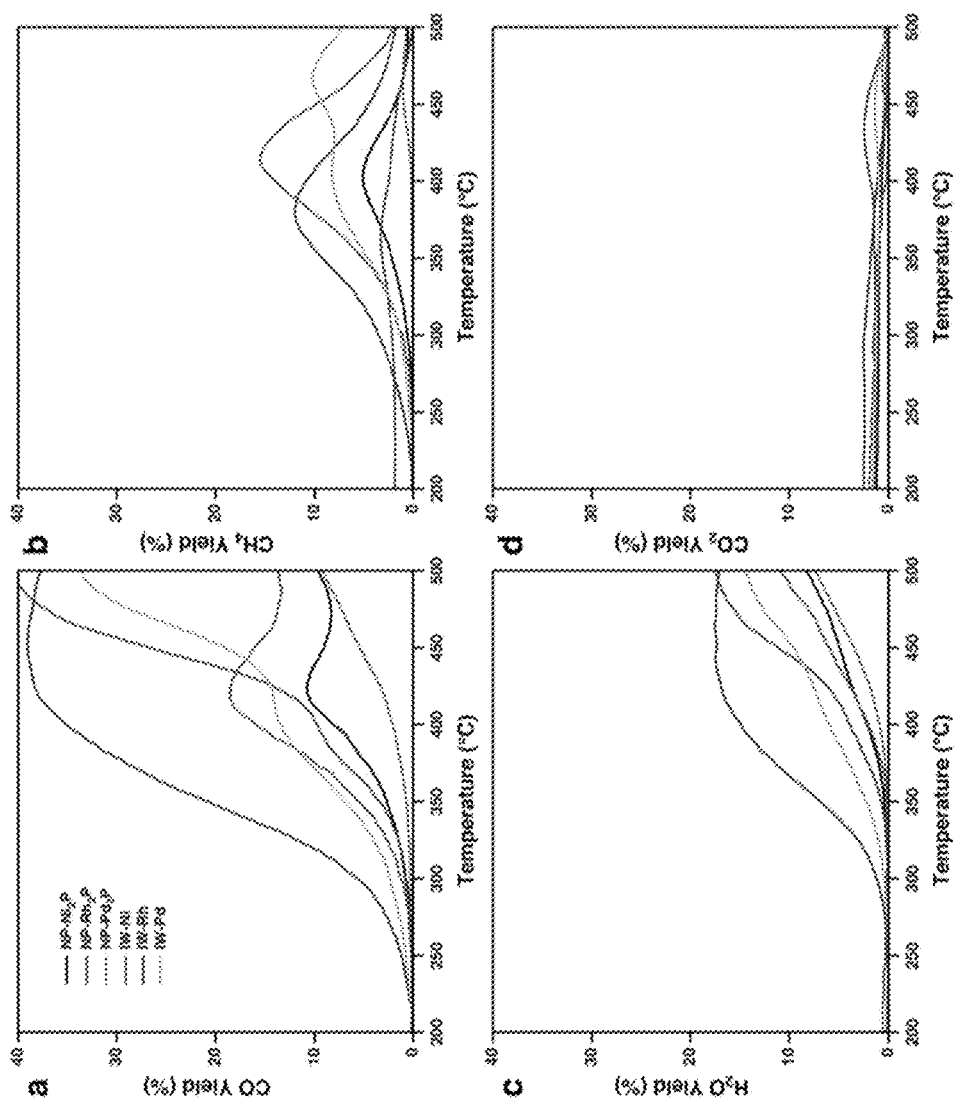
FIG. 7 illustrates TPRxn data for acetic acid hydrogenation over supported metal phosphide nanoparticle catalysts, according to embodiments of the present disclosure, and corresponding metal IW catalysts with production of; (Panel a) carbon monoxide, (Panel b) methane, (Panel c) water, and (Panel d) carbon dioxide.

As shown in FIG. 7≥Panel d, $CO_2$ yields are negligible, with a maximum yield of less than 5% for IW-Ni at 430° C. However, the most striking differences in the performance of the crystalline NP-metal phosphide and IW-metal catalysts are between the NP-$Ni_2P$ and IW-Ni catalysts. Under the low $H_2$ pressure conditions investigated here, NP-$Ni_2P$ performs $H_2$ activation, in contrast to the $H_2$ evolution exhibited by the IW-Ni catalyst. Thus, the behavior of the metal phosphide is significantly different from that of the parent metal, and more closely resembles that of the noble metal catalysts in terms of $H_2$ activation capability and reactivity towards acetic acid.

In contrast to the decomposition species that dominate the product slate, coupling (to form acetone), dehydration (to form ketene) and hydrogenation-dehydration (to form acetaldehyde and ethylene) species generally represented a minor fraction of the products. These minor products were largely comprised of acetone and ketene that do not rely on activation of $H_2$, and acetaldehyde that does require hydrogenation. However, these products were also observed in similar yields over the silica support. Minimal yields of ethylene were produced over each catalyst, and no ethanol was observed.

Figure 8:
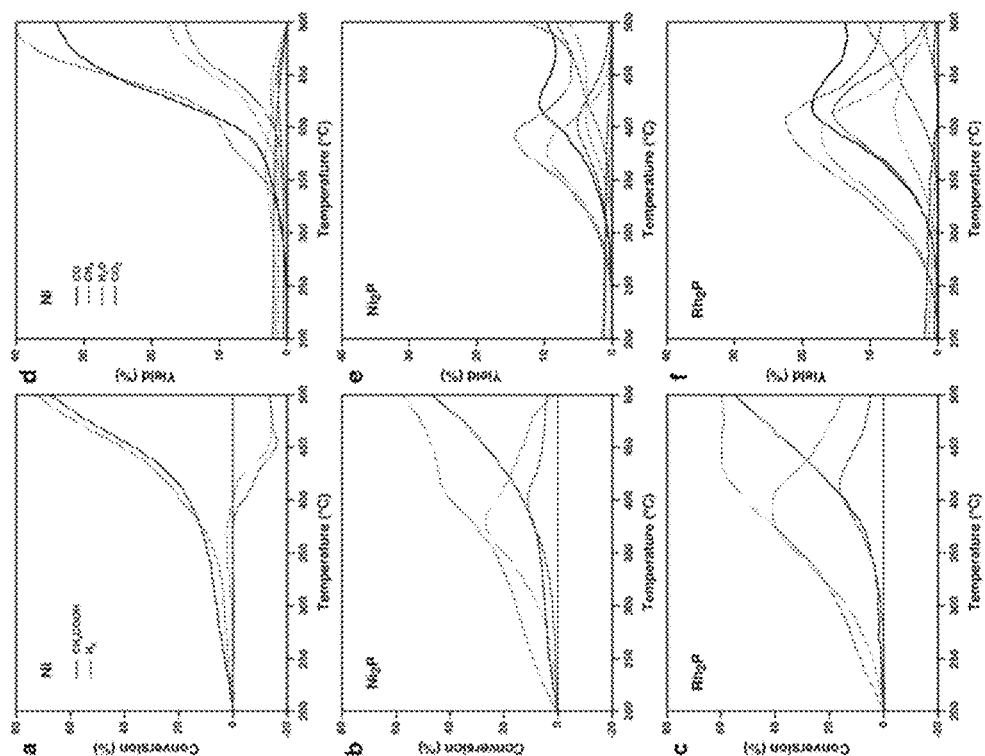
FIG. 8 illustrates TPRxn data for acetic acid hydrogenation according to embodiments of the present disclosure for; acetic acid and hydrogen conversion for (Panel a) $Ni/SiO_2$, (Panel b) $Ni_2P/SiO_2$, and (Panel c) $Rh_2P/SiO_2$, and product yields for (Panel d) $Ni/SiO_2$, (Panel e) $Ni_2P/SiO_2$, and (Panel f) $Rh_2P/SiO_2$. Solid lines represent NP catalysts and dotted lines the corresponding IW catalysts.

A comparison of acetic acid and $H_2$ conversion over the ligand-coated NP-Ni and ligand-free IW-Ni catalysts reveals nearly identical behavior for the two materials (FIG. 8—Panels a, d). The $H_2$/acetic acid ratios for these catalysts (Table 1) are also similar with negative values for NP-Ni starting at 400° C. and at 450° C. for IW-Ni. The IW-metal phosphide catalysts (FIG. 8—Panels b,c) exhibit greater acetic acid and $H_2$ conversions and significantly lower onset temperatures; however, the trends are similar to those for the NP-metal phosphide catalysts. The $H_2$/acetic acid ratios (Table 1) compare well between the NP- and IW-metal phosphide catalysts, with values close to unity at 350 and 400° C. These results demonstrate that the controlled, phase-pure, solid phosphide NPs, described here, behave similarly to standard IW metal phosphide materials. Although the decomposition products formed over IW-Ni agree well with those for the NP-Ni catalyst (FIG. 8—Panel d), the products formed over the IW-Ni$_2$P and IW-Rh$_2$P (FIG. 8—Panels e, f) exhibit slightly higher yields and lower onset and peak production temperatures than the corresponding crystalline NP-metal phosphide catalysts. The shifts to lower temperature in onset of reactant conversion and product evolution suggests a greater initial activity for the IW-metal and IW-metal phosphide catalysts, which could occur due to the absence of ligands. Previous results have demonstrated that ligand-coated catalysts may require an activation period, during which partial ligand removal may occur, in order to achieve full conversion. Overall, products that require activation of $H_2$, including CO and $CH_4$ from hydrogen-assisted decarbonylation, and hydrogenation-dehydration products acetaldehyde and ethylene exhibit shifts to lower onset and maximum production temperatures over IW-metal and IW-metal phosphide catalysts relative to the NP-metal and NP-metal phosphide materials. Therefore, it is likely that the presence of organic ligands on the surface of the NP catalysts inhibits hydrogen-assisted reactions that occur on the surfaces of the NPs at lower temperatures or without an activation step.

Bimetallic Phosphide Nanoparticle Synthesis.

Figure 13:
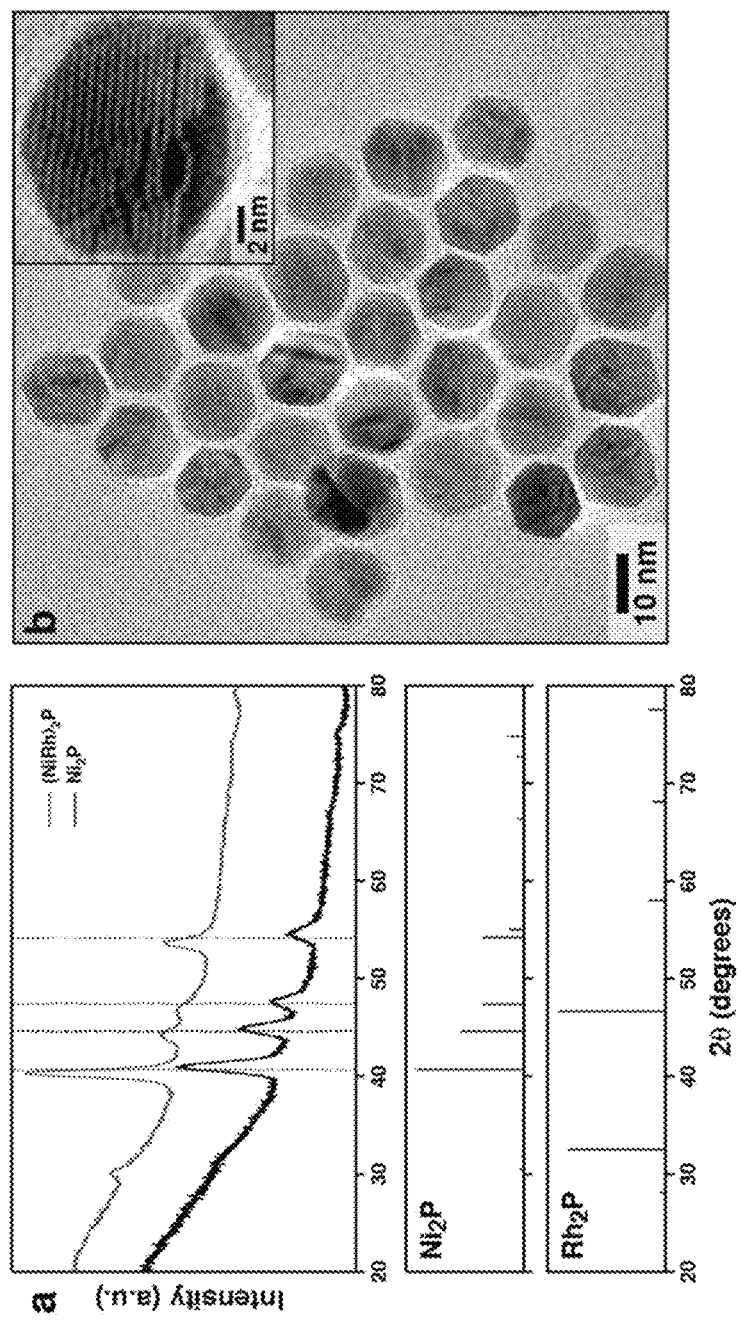
FIG. 13 illustrates (Panel a) XRD patterns of crystalline $(Ni_{0.8}Rh_{0.2})_2P$ and $Ni_2P$ NPs with reference patterns for the parent structures, below, and (Panel b) TEM image of $(Ni_{0.8}Rh_{0.2})_2P$ NPs with high resolution, inset, according to embodiments of the present disclosure.

FIG. 13 Panel (a) illustrates XRD data for unsupported crystalline $(Ni_xRh_y)_2P$ nanoparticles produced as described above, where x is about 0.8 and y is about 0.2. The shift of the parent peak at about 40 degrees 2θ indicates incorporation of Rh into the nickel phosphide structure. FIG. 13 Panel (b) illustrates TEM images of the $(Ni_{0.8}Rh_{0.2})_2P$ nanoparticles produced as described above. The images show that the $(Ni_{0.8}Rh_{0.2})_2P$ nanoparticles are solid (e.g. non-hollow) single crystals. The XRD spectrum of Panel (a) of FIG. 13 exhibits suppression of a peak for 2θ between about 42° and about 46°.

Figure 14:
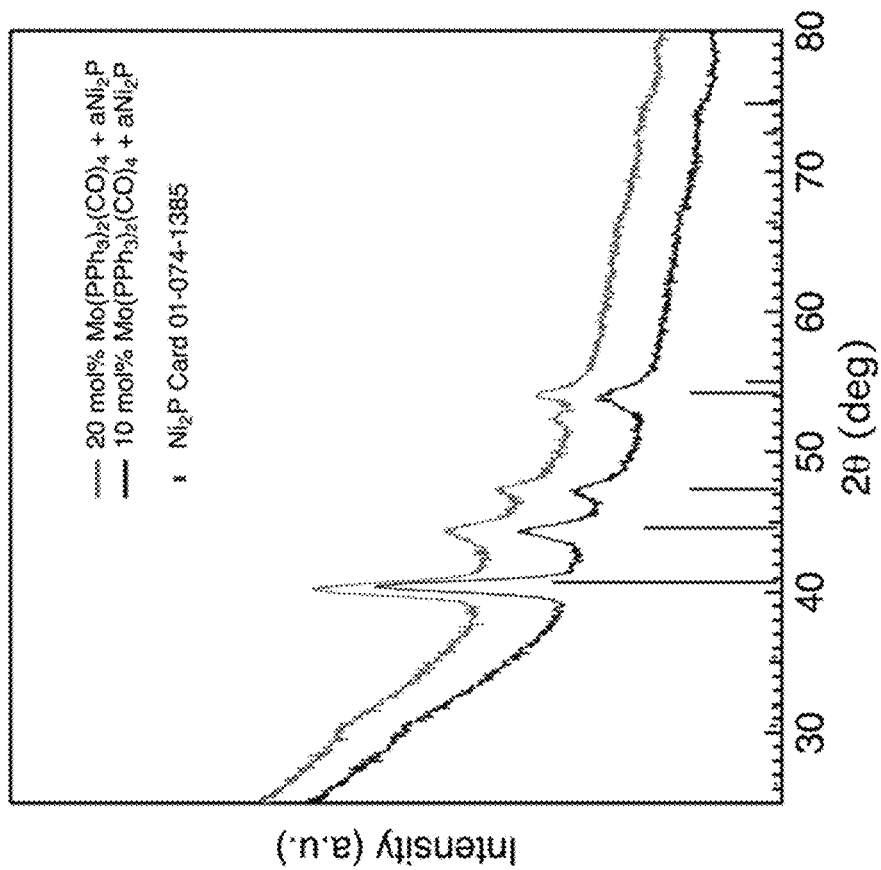
FIG. 14 illustrates XRD data of crystalline $(Ni_xMo_y)_2P$ nanoparticles made by methods described herein, according to embodiments of the present disclosure.
Figure 15B:
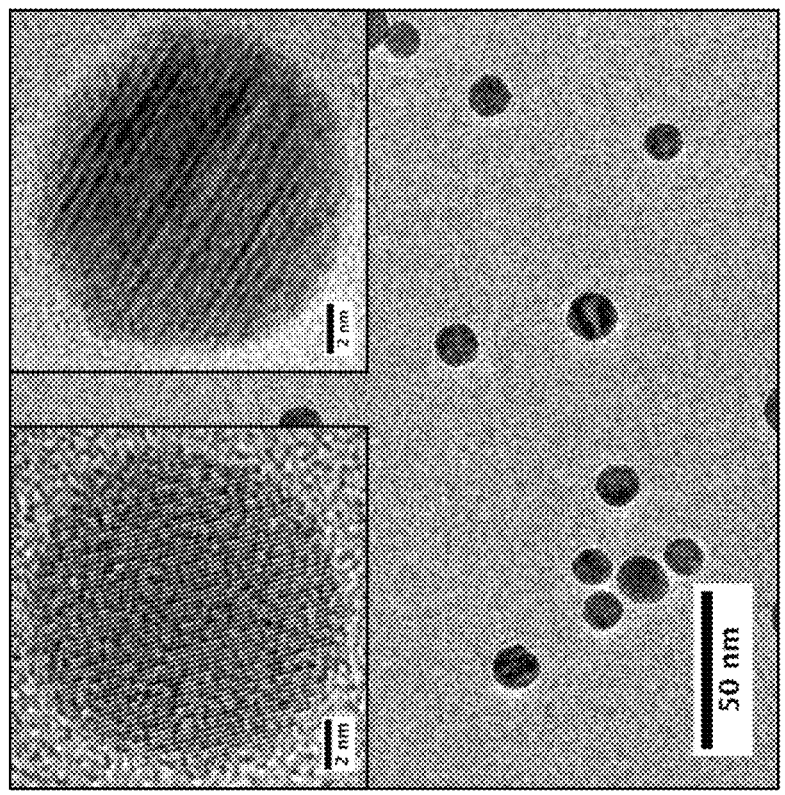
FIGS. 15a and 15b illustrate TEM images of the crystalline $(Ni_xMo_y)_2P$ nanoparticles produced as described herein, for the two starting amounts of the $Mo(PPh_3)_2(CO)_4$ precursor, 0.11 molar equivalents and 0.25 molar equivalents respectively, according to embodiments of the present disclosure.
Figure 15A:
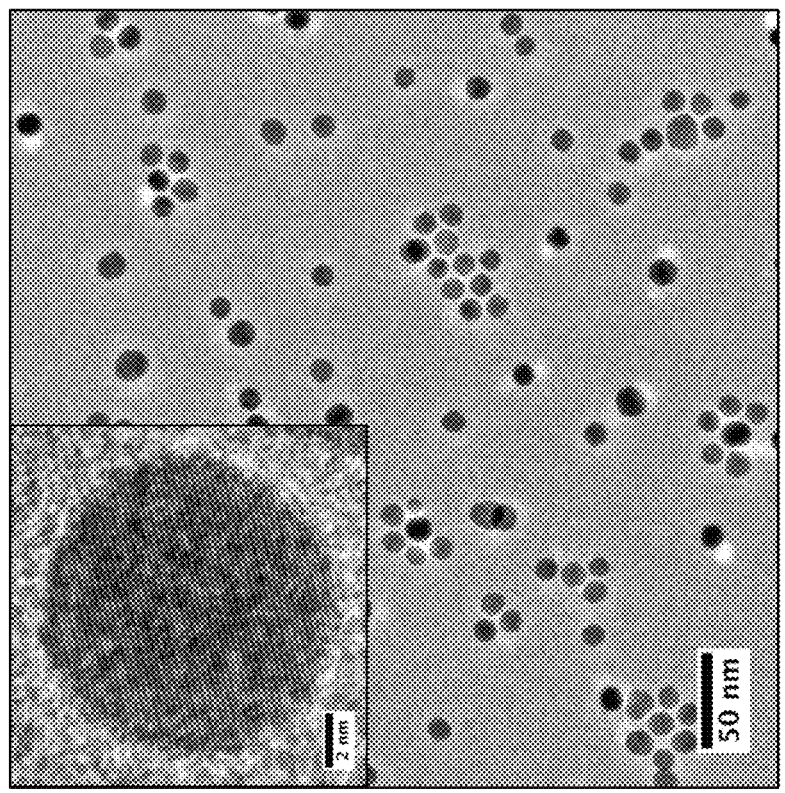

FIG. 14 illustrates XRD data for unsupported crystalline $(Ni_xMo_y)_2P$ nanoparticles produced as described above, where x is about 0.8 and y is about 0.2. The shift of the parent peak at about 40 degrees 2θ indicates incorporation of Mo into the nickel phosphide structure. FIGS. 15a and 15b illustrate TEM images of the $(Ni_xMo_y)_2P$ nanoparticles produced as described above, for the two starting amounts of the $Mo(PPh_3)_2(CO)_4$ precursor, 0.11 molar equivalents and 0.25 molar equivalents respectively. The images show that the $(Ni_xMo_y)_2P$ nanoparticles are solid (e.g. non-hollow) single crystals.

Figure 16:
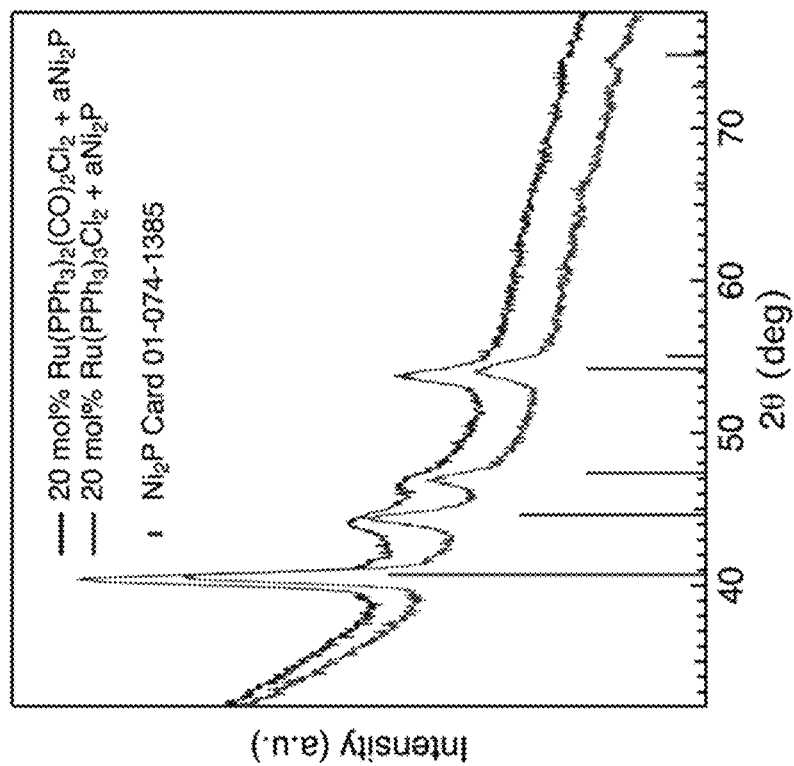
FIG. 16 illustrates XRD data of crystalline $(Ni_{0.8}Ru_{0.2})_2P$ nanoparticles made by methods described herein, according to embodiments of the present disclosure.
Figure 17B:
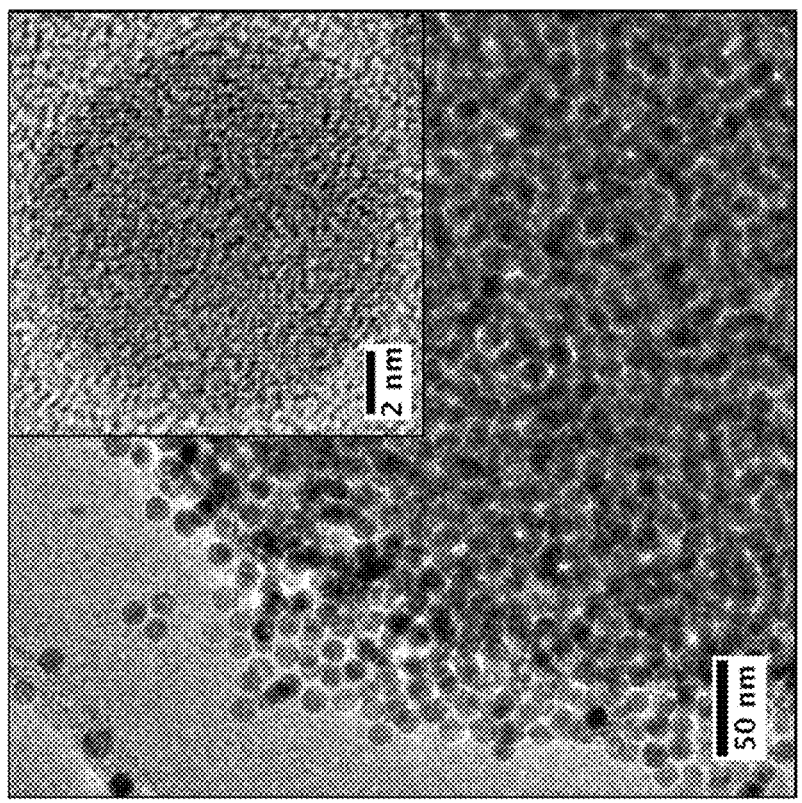
FIGS. 17a and 17b illustrate TEM images of the crystalline $(Ni_{0.8}Ru_{0.2})_2P$ nanoparticles produced as described herein, for the two Ru precursors, $Ru(PPh_3)_2(CO)_2Cl_2$ or $Ru(PPh_3)_3Cl_2$ respectively, according to embodiments of the present disclosure.
Figure 17A:
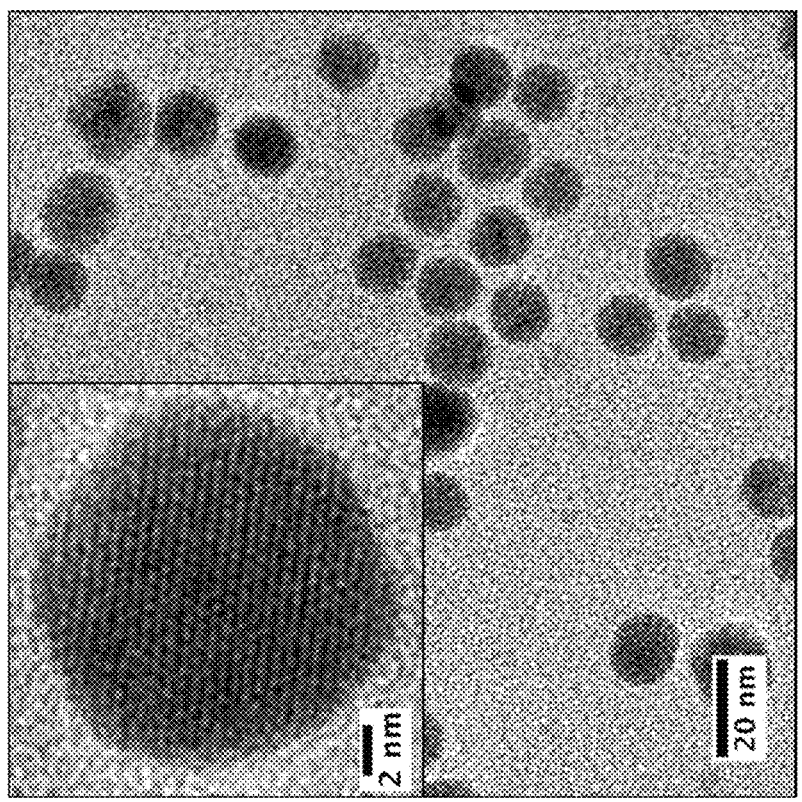

FIG. 16 illustrates XRD data for unsupported crystalline $(Ni_xRu_y)_2P$ nanoparticles produced as described above, where x is about 0.8 and y is about 0.2. The shift of the parent peak at about 40 degrees 2θ indicates incorporation of Ru into the Ni$_2$P structure. FIGS. 17a and 17b illustrate TEM images of the $(Ni_{0.8}Ru_{0.2})_2P$ nanoparticles produced as described above, for the two Ru precursors, $Ru(PPh_3)_2(CO)_2Cl_2$ or $Ru(PPh_3)_3Cl_2$ respectively. The images show that both precursors yield $(Ni_{0.8}Ru_{0.2})_2P$ nanoparticles that are solid (e.g. non-hollow) single crystals. The XRD spectrum of FIG. 16 exhibits suppression of a peak for 2θ between about 42° and about 46°.

Figure 18:
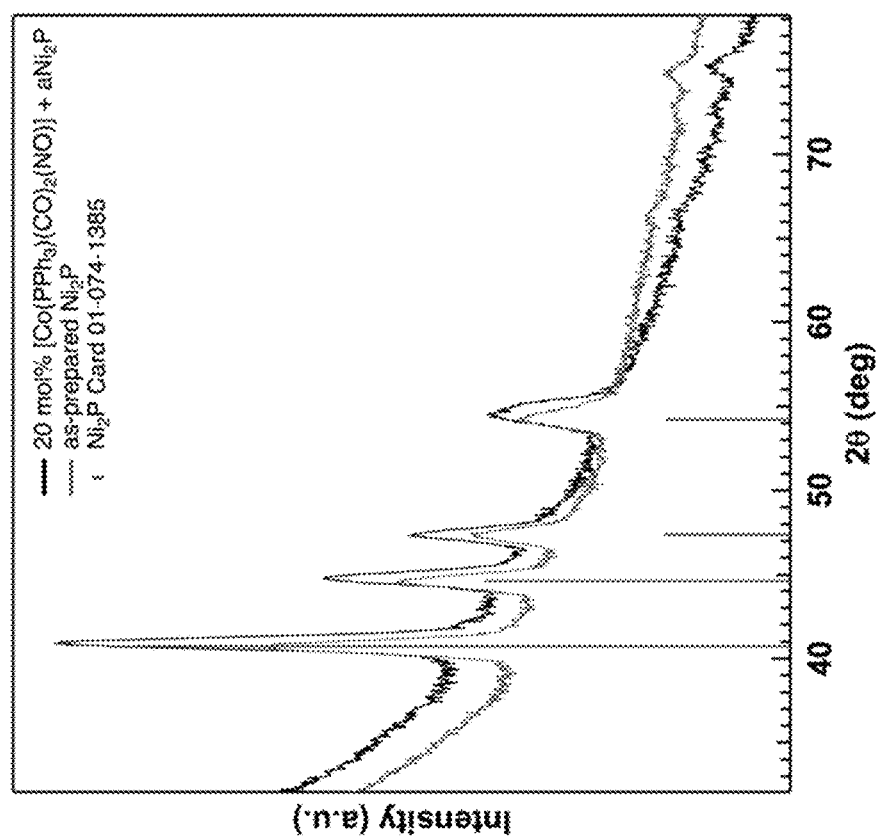
FIG. 18 illustrates XRD data of crystalline $(Ni_{0.8}Co_{0.2})_2P$ and $Ni_2P$ NPs nanoparticles made by methods described herein, according to embodiments of the present disclosure.
Figure 19:
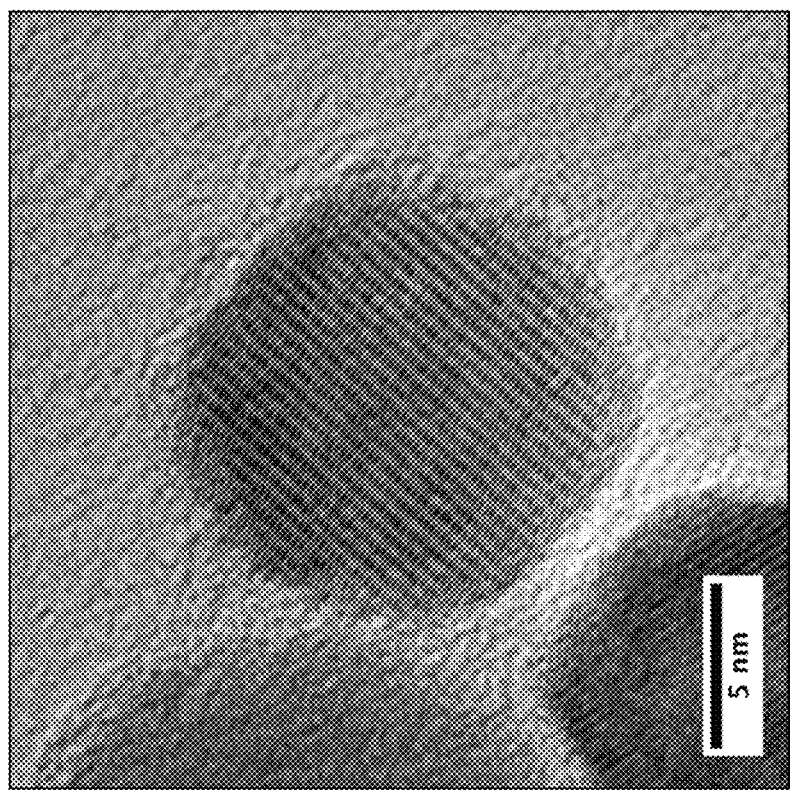
FIG. 19 illustrates TEM images of the crystalline $(Ni_{0.8}Co_{0.2})_2P$ nanoparticles produced as described herein, according to embodiments of the present disclosure.
Figure 19:
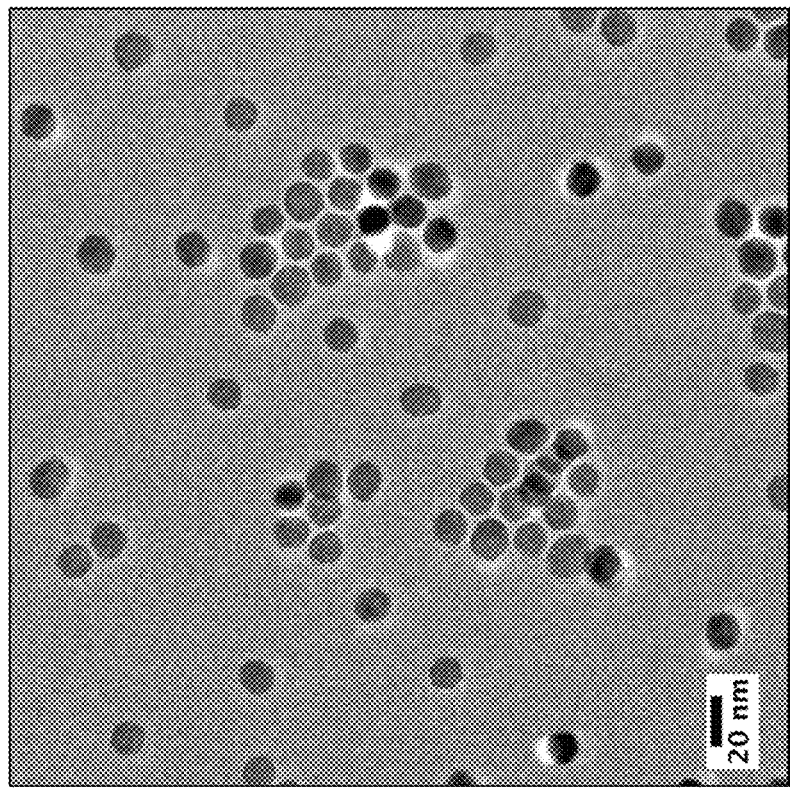

FIG. 18 illustrates XRD data for unsupported crystalline $(Ni_xCo_y)_2P$ nanoparticles produced as described above, where x is about 0.8 and y is about 0.2. The shift of the parent peak at about 40 degrees 2θ indicates incorporation of Co into the Ni$_2$P structure. FIG. 19 illustrates TEM images of the $(Ni_{0.8}Co_{0.2})_2P$ nanoparticles produced as described above. The images show that the $(Ni_{0.8}Co_{0.2})_2P$ nanoparticles are solid (e.g. non-hollow) single crystals.

Figure 20:
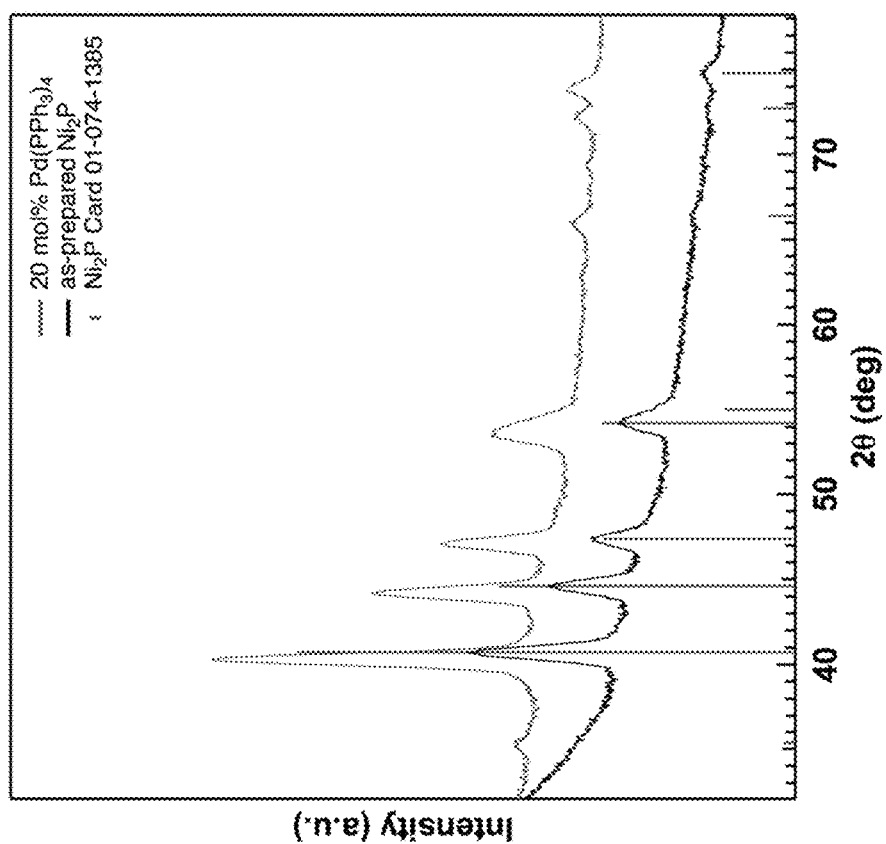
FIG. 20 illustrates XRD data of crystalline $(Ni_{0.8}Pd_{0.2})_2P$ and $Ni_2P$ NPs nanoparticles made by methods described herein, according to embodiments of the present disclosure.
Figure 21:
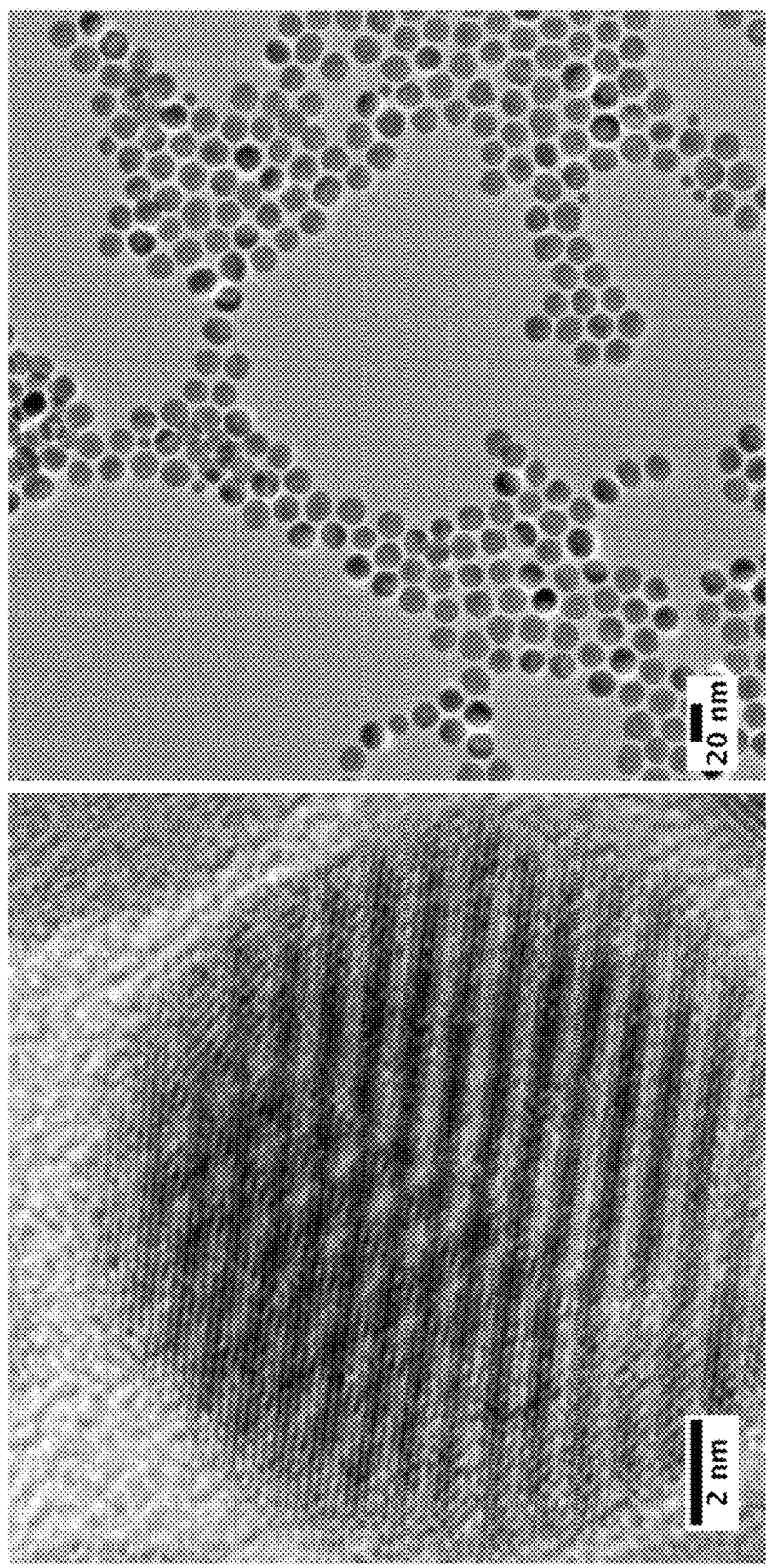
FIG. 21 illustrates TEM images of the crystalline $(Ni_{0.8}Pd_{0.2})_2P$ nanoparticles produced as described herein, according to embodiments of the present disclosure.

FIG. 20 illustrates XRD data for unsupported crystalline $(Ni_xPd_y)_2P$ nanoparticles produced as described above, where x is about 0.8 and y is about 0.2. The shift of the parent peak at about 40 degrees 2θ indicates incorporation of Pd into the Ni$_2$P structure. FIG. 21 illustrates TEM images of the $(Ni_{0.8}Pd_{0.2})_2P$ nanoparticles produced as described above. The images show that the $(Ni_{0.8}Pd_{0.2})_2P$ nanoparticles are solid (e.g. non-hollow) single crystals.

Supporting Material

Mass Spectrometry Data Analysis

Reactants and products were monitored during temperature programmed reaction (TPRxn) experiments with an online mass spectrometer (RGA 100, Stanford Research Systems). Table 2 displays the relative intensities for each mass fragment of a given compound. All mass fragmentation patterns (except ketene) were obtained by collecting mass spectra of the vapor of each analyte through the system to account for instrument-specific differences in the mass fragmentation patterns. The mass fragment intensities, highlighted in red, were identified as the primary mass fragments for each compound.

TABLE 2

Fragmentation patterns and relative mass fragment intensities for observed products

| Compound | Mass Fragment | | | | | | | | | | | | | | | | | | | |
|---|---|---|---|---|---|---|---|---|---|---|---|---|---|---|---|---|---|---|---|---|
| | 60 | 58 | 45 | 44 | 42 | 41 | 40 | 39 | 29 | 28 | 27 | 26 | 25 | 18 | 17 | 16 | 15 | 14 | 13 | 12 | 4 | 2 |
| Acetaldehyde | — | — | 3 | 59 | 11 | 5 | — | — | 100 | 15 | 5 | 13 | 5 | 2 | 1 | 10 | 66 | 26 | 11 | 5 | — | — |
| Acetic Acid | 44 | — | 83 | — | — | — | — | — | 20 | 63 | — | — | — | — | — | — | 34 | 24 | — | — | — | — |
| Acetone | — | 23 | 1 | 3 | 7 | 3 | 8 | 11 | 5 | 18 | 7 | 6 | 1 | 2 | — | 1 | 24 | 5 | 1 | — | — | — |
| Carbon Dioxide | — | — | 1 | 100 | — | — | — | — | — | 15 | — | — | — | 1 | — | 9 | — | — | — | 3 | — | — |
| Carbon Monoxide | — | — | — | — | — | — | — | — | — | 100 | — | — | — | 1 | — | 2 | — | — | — | 3 | — | — |
| Ethylene | — | — | — | — | — | — | — | — | 2 | 100 | 59 | 58 | 11 | — | — | — | 1 | 4 | 2 | 1 | — | — |
| Helium | — | — | — | — | — | — | — | — | — | — | — | — | — | — | — | — | — | — | — | — | 100 | — |
| Hydrogen | — | — | — | — | — | — | — | — | — | — | — | — | — | — | — | — | — | — | — | — | — | 100 |
| Ketene | — | — | — | — | 94 | 27 | 5 | — | 7 | 11 | — | 1 | 6 | — | — | 1 | 1 | 100 | 13 | 12 | — | — |
| Methane | — | — | — | — | — | — | — | — | — | — | — | — | — | 1 | 2 | 100 | 76 | 13 | 6 | 2 | — | — |
| Water | — | — | — | — | — | — | — | — | — | — | — | — | — | 100 | 21 | 1 | — | — | — | — | — | — |

The mass fragments in Table 2 were recorded as a function of reaction temperature and corrected for overlapping signals, or deconvoluted, according to a method adapted from Zhang, et al.[2] A system of linear equations was derived from mass conservation to solve for the corrected signals of each compound as function of temperature and is expressed as R, where R is a matrix of $N_T$ rows by $N_i$ columns representing the mass spectral data set.

$$R = C*MS \quad (1)$$

Each row of R is the mass spectrum at a given temperature (T) and each column corresponds to a mass-to-charge ratio (i). C is a $N_T$ by $N_c$ matrix of corrected signals for all of the $N_c$ compounds. MS is the $N_c$ by $N_i$ fragmentation pattern displayed in Table S2. The system of linear equations may be solved for C to obtain the deconvoluted signal for each $N_c$ compound as a function of temperature. As a result of the linear algebra operations, each $N_c$ compound signal in C was normalized to an aggregate fragmentation pattern intensity, $F_{m,normal}$, which accounts for contributions to the compound signal from more than one mass-to-charge ratio. For example, $F_{m,normal}$ for hydrogen is equal to the normalized intensity of the primary mass fragment ($F_{m,normal}$=100 for m/e=2) whereas for acetaldehyde $F_{m,normal}$ is equal to 132.8 as a result of overlapping signals in the fragmentation pattern, and thus multiple contributions to the compound signal. The deconvolution method was completely dependent on the fragmentation pattern, MS, and did not require any user input (i.e., primary mass fragment identification). The deconvoluted data were then corrected according to methods known to one of ordinary skill in the art for relative differences in ionization efficiency ($I_x$), quadrupole transmission ($T_m$), and electron multiplier gain ($G_m$). The ionization efficiency is primarily dependent on the number of electrons per molecule expressed as $I_x$.

$$I_x = 0.6 * \frac{[\# \text{ of } e^-]}{14} + 0.4 \quad (2)$$

The gain of the electron multiplier, $G_m$, is a function of ion mass and was calculated relative to carbon monoxide (CO).

$$G_m = \sqrt{\frac{28}{MW}} \quad (3)$$

In addition, the quadrupole transmission is also a function of ion mass and was approximated as $T_m$.

$$T_m = \begin{cases} 10^{(30-MW)/155} & MW > 30 \\ 1 & MW < 30 \end{cases} \quad (4)$$

The final correction factor is given by $C_F$, where the summation is over all mass fragments for the compound and $F_m$ is the normalized fragmentation pattern intensity of the mass fragment.

$$C_F = \frac{1}{100 * I_x} * \sum_{\text{mass fragment}} \frac{F_m}{G_m * T_m} \quad (5)$$

The final mass spectrum data is found by multiplying the deconvoluted data, C, by the correction factors shown below in Table 3. Primary mass fragments in Table S3 were identified based on the solution to eq (1). The primary mass fragments were considered the major fragments contributing to the respective species signal in C, but other mass fragments of a given species also contributed as the deconvoluted signals in C represent the complex fragmentation overlap in MS.

TABLE 3

Correction factors and primary mass fragments for compounds of interest

| Compound | Primary Mass Fragment | Correction Factor |
|---|---|---|
| Acetaldehyde | 29 | 2.4 |
| Acetic Acid | 45 | 2.0 |
| Acetone | 58 | 0.9 |
| Carbon Dioxide | 44 | 1.3 |
| Carbon Monoxide | 28 | 1.0 |
| Ethylene | 27 | 2.1 |
| Helium | 4 | 0.8 |
| Hydrogen | 2 | 0.6 |
| Ketene | 14 | 2.2 |
| Methane | 16 | 1.8 |
| Water | 18 | 1.2 |

The corrected product intensities were smoothed using a Savitzky-Golay filter with a smoothing ratio of <0.2, which is the ratio between the smooth width and the number of points in the smallest FWHM of the data set. The data was trimmed from 200-500° C., normalized to zero, and then converted to reactant conversions and product yields. Acetic acid conversion is expressed as $X_a$, where $I_a$ is the intensity of acetic acid and $I_{a_i}$ is the initial intensity of acetic acid at 200° C.

$$X_a = 1 - \frac{I_a}{I_{a_i}} * 100 \quad (6)$$

Hydrogen conversion is defined as $X_{H_2}$, where $I_{H_2}$ is the intensity of $H_2$ and $I_{H_{2_i}}$ is the initial intensity of $H_2$ at 200° C.

$$X_{H_2} = 1 - \frac{I_{H_2}}{I_{H_{2_i}}} * 100 \quad (7)$$

The carbon yield for each product is given as $Y_p$, where $I_p$ is the intensity of product p, $c_p$ is the carbon number in product p, and $c_a$ is the carbon number in acetic acid.

$$Y_p = \frac{I_p c_p}{I_{a_i} c_a} * 100 \quad (8)$$

The oxygen-based water yield is shown as $Y_{H_2O}$, where $I_{H_2O}$ is the intensity of $H_2O$ and $O_a$ is the oxygen number in acetic acid.

$$Y_{H_2O} = \frac{I_{H_2O}}{I_{a_i} O_a} * 100 \quad (9)$$

The invention has been described with reference to various specific and preferred embodiments and techniques. However, it should be understood that many variations and modifications may be made while remaining within the spirit and scope of the invention.

What is claimed is:

1. A method comprising:
heating to a target temperature a mixture comprising:
a metal phenylphosphine- and carbonyl-containing precursor comprising at least one of $Mo(PPh_3)_2(CO)_4$, $Ru(PPh_3)_2(CO)_2Cl_2$, $Co(PPh_3)(CO)_2(NO)$, or $Rh(PPh_3)_2(CO)Cl$;
oleylamine; and
1-octadecene, wherein:
the heating results in a mixture containing a metal phosphide nanoparticle comprising at least one of MoP, $Ru_2P$, $Co_2P$, or $Rh_2P$, and
the target temperature is between 250° C. and 320° C.

2. The method of claim 1, wherein the target temperature is maintained for a time period between 15 minutes and 4 hours.

3. The method of claim 1, wherein
the metal phosphide nanoparticle comprises at least one of a hexagonal crystal structure or a cubic crystal structure.

4. The method of claim 1, wherein the metal phosphide nanoparticle has an XRD spectrum that exhibits suppression or elimination of a peak for 2θ between 42° and 46°.

5. The method of claim 1, wherein the metal phosphide nanoparticle has an average particle size between 2 nm and 50 nm.

6. The method of claim 1, further comprising separating the metal phosphide nanoparticle from the mixture.

7. The method of claim 6, wherein the separating is performed by centrifugation.

8. The method of claim 1, wherein the metal phosphide nanoparticle is not hollow.

* * * * *